United States Patent
Ogawa et al.

(10) Patent No.: US 7,242,124 B2
(45) Date of Patent: Jul. 10, 2007

(54) SEQUENTIALLY JOINED-SEGMENT COIL FOR ROTARY ELECTRICAL MACHINE

(75) Inventors: Shinichi Ogawa, Oobu (JP); Akira Fukushima, Kariya (JP)

(73) Assignee: Denso Corporation, Kariya (JP)

( * ) Notice: Subject to any disclaimer, the term of this patent is extended or adjusted under 35 U.S.C. 154(b) by 40 days.

(21) Appl. No.: 11/237,654

(22) Filed: Sep. 29, 2005

(65) Prior Publication Data

US 2006/0033394 A1    Feb. 16, 2006

Related U.S. Application Data

(62) Division of application No. 10/457,643, filed on Jun. 10, 2003, now Pat. No. 6,979,926.

(30) Foreign Application Priority Data

| Jun. 12, 2002 | (JP) | ............... | 2002-171230 |
| Jun. 12, 2002 | (JP) | ............... | 2002-171242 |
| Jul. 30, 2002 | (JP) | ............... | 2002-221256 |
| Nov. 13, 2002 | (JP) | ............... | 2002-329775 |

(51) Int. Cl.
*H02K 3/04* (2006.01)
*H02K 3/28* (2006.01)

(52) U.S. Cl. ............... 310/180; 310/179; 310/201; 310/184; 310/206; 310/207

(58) Field of Classification Search ............. 310/201, 310/206, 207, 179, 180, 184, 208, 205, 198
See application file for complete search history.

(56) References Cited

U.S. PATENT DOCUMENTS

| 3,321,653 | A | | 5/1967 | Sonoyama |
| 4,402,129 | A | * | 9/1983 | Kreuzer et al. ............. 310/184 |
| 4,492,890 | A | | 1/1985 | MacDonald |
| 5,231,324 | A | * | 7/1993 | Kawamura et al. ......... 310/198 |
| 5,376,852 | A | * | 12/1994 | Kawamura et al. ......... 310/198 |
| 5,773,905 | A | * | 6/1998 | Hill ........................... 310/179 |
| 5,936,326 | A | | 8/1999 | Umeda et al. |
| 5,952,749 | A | | 9/1999 | Umeda et al. |
| 5,955,810 | A | | 9/1999 | Umeda et al. |
| 5,965,965 | A | | 10/1999 | Umeda et al. |
| 5,982,068 | A | | 11/1999 | Umeda et al. |
| 5,986,375 | A | | 11/1999 | Umeda et al. |
| 5,994,813 | A | | 11/1999 | Umeda et al. |
| 5,998,903 | A | | 12/1999 | Umeda et al. |

(Continued)

FOREIGN PATENT DOCUMENTS

EP    0 881 746 A2    12/1998

(Continued)

*Primary Examiner*—Karl Tamai
(74) *Attorney, Agent, or Firm*—Oliff & Berridge, PLC

(57) ABSTRACT

A polyphase sequentially joined-segment coil of a rotary electric machine and a production method thereof are provided. The coil is made up of a plurality of conductor segments joined in series. Each of the conductor segments a head projecting from a stator core, a pair of legs, and a pair of ends projecting from the stator core. The heads are of two types: a large-sized head and a small-sized head extending inside the large-sized head. This structure permits the length of the conductor segments in an axial direction of the core to be decreased and improves cooling capability of the machine and coil losses.

1 Claim, 27 Drawing Sheets

HEAD SIDE OF U3-CONDUCTOR SEGMENT

U.S. PATENT DOCUMENTS

| | | | |
|---|---|---|---|
| 6,011,332 A | 1/2000 | Umeda et al. | |
| 6,020,669 A | 2/2000 | Umeda et al. | |
| 6,051,906 A | 4/2000 | Umeda et al. | |
| 6,091,169 A | 7/2000 | Umeda et al. | |
| 6,097,130 A | 8/2000 | Umeda et al. | |
| 6,124,660 A | 9/2000 | Umeda et al. | |
| 6,137,201 A | 10/2000 | Umeda et al. | |
| 6,144,136 A | 11/2000 | Umeda et al. | |
| 6,181,043 B1 | 1/2001 | Kusase et al. | |
| 6,181,045 B1 | 1/2001 | Umeda et al. | |
| 6,198,190 B1 | 3/2001 | Umeda et al. | |
| 6,201,332 B1 * | 3/2001 | Umeda et al. | 310/184 |
| 6,249,956 B1 | 6/2001 | Maeda et al. | |
| 6,291,918 B1 | 9/2001 | Umeda et al. | |
| 6,326,715 B1 * | 12/2001 | Asao et al. | 310/180 |
| 6,414,410 B1 * | 7/2002 | Nakamura et al. | 310/179 |
| 6,459,186 B1 | 10/2002 | Umeda et al. | |
| 6,787,961 B2 * | 9/2004 | Neet et al. | 310/201 |
| 6,825,589 B2 | 11/2004 | Kouda et al. | |
| 6,894,417 B2 * | 5/2005 | Cai et al. | 310/198 |
| 6,979,926 B2 * | 12/2005 | Ogawa et al. | 310/180 |
| 6,995,492 B1 * | 2/2006 | Kouda et al. | 310/254 |
| 2002/0053126 A1 | 5/2002 | Maeda et al. | |
| 2003/0230949 A1 * | 12/2003 | Ogawa et al. | 310/180 |
| 2006/0033394 A1 * | 2/2006 | Ogawa et al. | 310/179 |

FOREIGN PATENT DOCUMENTS

| | | |
|---|---|---|
| EP | 0 945 962 A1 | 9/1999 |
| EP | 0 986 160 A2 | 3/2000 |
| EP | 1 107 427 A2 | 6/2001 |
| EP | 1 179 880 A2 | 2/2002 |
| JP | A-11-346448 | 12/1999 |
| JP | A 2000-92766 | 3/2000 |
| JP | B2 3118837 | 10/2000 |
| JP | B1 3155532 | 2/2001 |
| JP | B2 3196738 | 6/2001 |
| JP | A 2001-186704 | 7/2001 |

* cited by examiner

→ RADIAL INSIDE

SEQUENTIALLY JOINED-SEGMENT COIL FOR ROTARY ELECTRICAL MACHINE

This is a Division of application Ser. No. 10/457,643 filed Jun. 10, 2003 now U.S. Pat. No. 6,979,926. The entire disclosure of the prior application is hereby incorporated by reference herein in its entirety.

BACKGROUND OF THE INVENTION

1. Technical Field of the Invention

The present invention relates generally to a sequentially joined-segment coil of a rotary electric machine and a production method thereof.

2. Background Art

Sequentially joined-segment stator coils have been proposed which are made by sequentially join ends of conductor segments inserted in slots in a stator core. For instance, Japanese Patent Nos. 3118837 and 3196738, assigned to the same assignee as that of this application, disclose a production method of joining U-shaped conductor segments in sequence to make a stator coil.

The sequentially joined segment stator coil, as taught in the above patents, is made by inserting a pair of legs of each conductor segment into two of slots of a core located at an interval away from each other which is substantially equivalent to a magnetic pole pitch of a rotor, bending end portions of the legs projecting from the slots in a circumferential direction of the core, and joining the end portions of the conductor segments in series.

The conductor segments each consist of a U or V-shaped head (also called a turn), a pair of side conductor portions extending from the head to be inserted into two of the slots of the core from an axial direction of the core, and end portions which project from the side conductor portions toward the other side of the slots and extend in the circumferential direction of the core. The projecting end portions are joined in pair. In the following discussion, the side conductor portion and the projecting end portion will also be referred to as a leg as a whole, the heads of the conductor segments will also be referred to as a segment head-side coil end of the stator coil, and the projecting end portions will also be referred to as a segment end-side coil end of the stator coil.

Japanese Patent Publication No. 2000-92766 discloses a sequentially joined-segment stator coil in which six side conductor portions of conductor segments are aligned in a radius direction of the core and inserted into one of the slots of the core. In the segment head-side coil end, the head leading to an innermost one (i.e., the first one) of the six side conductor portions inserted into one of the slots and an outermost one of the six side conductor portions inserted into another slot are the largest outer heads, the head leading to the second and fifth ones of the side conductor portions extending inside the first and sixth ones forms a central head, and the head leading to innermost two (i.e., the third and fourth ones) of the side conductor portions extending inside the second and fifth ones forms an inner head.

The above sequentially joined-segment stator coil is produced in the following steps. First, a required number of pine needle-like conductor segments are prepared. Each of the conductor segments is formed into a U-shape one with side conductor portions extending at a magnetic pole pitch interval away from each other. The side conductor portions of each conductor segment are placed in alignment with two of the slots formed in the core, respectively, (i.e., in a circumferential direction of the core) for simultaneous insertion of the side conductor portions into the slots. These steps may be achieved with a pair of coaxially arrayed rings with slots, as illustrated in FIG. 3 of Japanese Patent No. 3118837. Specifically, legs of each conductor segment are fitted in two of the slots aligned in a radius direction of the rings. Next, the rings are turned relative to each other through a given angle equivalent to a magnetic pole pitch to spread the legs, thereby forming the U-shaped conductor segment. Subsequently, the head of each of the U-shaped conductor segments is held. The legs are drawn from the slots and then inserted into the slots of the core.

Next, end portions of the legs projecting from the slots are bent in the circumferential direction of the core by half a magnetic pole pitch. Such bending may be achieved with a plurality of coaxially arrayed rings with slots, as illustrated in FIGS. 4 and 5 of Japanese Patent No. 03196738. Specifically, tips of the projecting end portions of the legs are inserted into the slots of the rings. The rings are rotated in the circumferential direction by half a magnetic pole pitch (i.e., an electrical angle of $\pi/2$) to bent the projecting end portions in the circumferential direction through half the magnetic pole pitch. It is advisable that the rotation of the rings be performed while urging the rings toward the projecting end portions (i.e., the axial direction of the core) for increasing the radius of curvature of the turn of each conductor segment. Next, the projecting end portions are welded in a given sequence, thereby forming an endless phase coil. Any one of the heads of the U-shaped conductor segments is cut to define coil terminals. If the coil terminals are made longer and bent in the circumferential direction, they may be employed as a neutral point connecting line. The reason that the coil terminals are provided in the segment head-side coil end is because if the coil terminals are provided in the segment end-side coil end, they will interface with welding of the end portions of the conductor segments.

The above sequentially joined-segment stator coil, however, encounters the drawback in that the three heads or turns of the conductor segments disposed in each slot of the core are laid to overlap each other in the axial direction (i.e., a thickness-wise direction) of the core, thus resulting in an increase in length of the coil end (i.e., the projecting end portions of the conductor segments), which leads to an increased total length of a rotary electric machine.

Additionally, the largest outer heads of the conductor segments lead to the outermost side conductor portions and the innermost side conductor portions in the slots, thus requiring a longer length of the segment head-side coil end, which results in increases in coil resistance leading to a coil loss and in ventilating resistance of the coil ends leading to a reduction in cooling capability.

SUMMARY OF THE INVENTION

It is therefore a principal object of the invention to avoid the disadvantages of the prior art.

It is another object of the invention to provide a sequentially joined-segment stator coil for a rotary electric machine which is designed to permit a total length of the electric machine to be decreased and improved cooling capability without increasing coil losses.

It is a further object of the invention to provide a rotary electrical machine or a sequentially joined-segment coil which is designed to permit the size thereof to be decreased and the number of turns to be increased.

According to one aspect of the invention, there is provided a sequentially joined-segment stator coil of a rotary electrical machine which may be employed as a three-phase DC motor. The rotary electrical machine comprises: (a) a stator core having opposed ends and slots formed at given intervals in a circumferential direction of the stator core; (b) and a plurality of conductor segments each including a head portion, a pair of slot-inserted portions, and a pair of end portions. Each of the head portion has one of substantially U- and V-shapes and extends in a circumferential direction of the stator core at one of the ends of the stator core in an axial direction thereof. The head portions of the conductor segments define a segment head-side coil end of the stator coil. The slot-inserted conductor portions of each pair continue from ends of one of the head portions and are inserted into two of the slots formed in the stator core. Six of the slot-inserted conductor portions are arrayed in line in a radius direction of the stator core within each of the slots of the stator core. The end portions project from the slot-inserted conductor portions outside the other end of the stator core in the axial direction thereof and extend substantially in the circumferential direction of the stator core. The end portions define a segment end-side coil end of the stator coil.

The conductor segments are connected at least through joints each provided between two of tips of the end portions. The segment head-side coil end includes the head portions which lead to the first and fourth slot-inserted conductor portions as counted from a radial inside of the stator core and have a larger size, the head portions which lead to the second and third slot-inserted conductor portions and have a smaller size, and the head portions which lead to the fifth and sixth slot-inserted conductor portions and have a smaller size.

According to the second aspect of the invention, there is provided a sequentially joined-segment stator coil of a rotary electric machine which comprises: (a) a stator core having opposed ends and slots formed at given intervals in a circumferential direction of the stator core; and (b) a plurality of conductor segments each including a head portion, a pair of slot-inserted portions, and a pair of end portions. Each of the head portions has one of U- and V-shapes and extends in a circumferential direction of the stator core at one of the ends of the stator core. The head portions of the conductor segments define a segment head-side coil end of the stator coil. The slot-inserted conductor portions of each pair continue from ends of one of the head portions and are inserted into two of the slots formed in the stator core. Six of the slot-inserted conductor portions are arrayed in line in a radius direction of the stator core within each of the slots of the stator core. The end portions project from the slot-inserted conductor portions outside the other end of the stator core in the axial direction thereof and extend substantially in the circumferential direction of the stator core. The end portions define a segment end-side coil end of the stator coil.

The conductor segments are connected at least through joints each provided between two of tips of the end portions. The segment head-side coil end includes the head portions which lead to the sixth and third slot-inserted conductor portions as counted from a radial inside of the stator core and have a larger size, the head portions which lead to the fifth and fourth slot-inserted conductor portions and have a smaller size, and the head portions which lead to the second and first slot-inserted conductor portions and have a smaller size.

The structure, as defined in each of the above first and second inventions, permits the length of the segment head-side coil end from the end of the stator core to be decreased and the length of the head portions of the large size to be decreased, thus improving coil losses and facilitating a flow of ventilating air through the coil ends to improve the cooling capability of the rotary electrical machine.

In the preferred mode of the above first and second inventions, the segment end-side coil end of the stator coil is made up of the end portions which are joined together and lead to the first and second slot-inserted conductor portions as counted from a radial inside of the stator core, the end portions which are joined together and lead to the third and fourth slot-inserted conductor portions, and the end portions which are joined together and lead to the fifth and sixth slot-inserted conductor portions.

The head portions of the smaller size which are not surrounded by the head portions of the larger size each have a length, as projecting from the end of the stator core, shorter than that of the head portions of the larger size.

According to the third aspect of the invention, there is provided a rotary electrical machine for a high-voltage vehicle which comprises: (a) a stator core having opposed ends and slots formed at given intervals in a circumferential direction of the stator core; and (b) a three-phase sequentially joined-segment stator coil which includes three phase coils joined together through one of star connection and delta connection. Each of the phase coils includes a plurality of conductor segments each of which includes a head portion, a pair of slot-inserted portions, and a pair of end portions. Each of the head portions has one of substantially U- and V-shapes and extends in a circumferential direction of the stator core at one of the ends of the stator core. The slot-inserted conductor portions of each pair continue from ends of one of the head portions and are inserted into two of the slots of the stator core which are spaced at given slot pitches. A given number of the slot-inserted conductor portions are disposed in each of the slots in alignment in a radius direction of the stator core. The end portions project from the slot-inserted conductor portions outside the other end of the stator core in the axial direction thereof and extend substantially in the circumferential direction of the stator core.

The conductor segments are connected in series through joints each provided between two of tips of the end portions to complete each of the phase coils. Each of the phase coils is made up of different types of the conductor segments joined in series. The types are different from one another in slot pitch between the slots within which the slot-inserted portions of each of the conductor segments are disposed.

Specifically, each of the phase coils is made up of the different types of conductor segments which are different in slot pitch from each other, thereby avoiding physical interference between the conductor segments without increasing the magnetic poles of the stator coil.

In the preferred mode of the invention, six of the slot-inserted conductor portions are arrayed in each of the slots in line in a radius direction of the stator core.

Each of the slot-inserted conductor portions of each of the conductor segments forming each of the phase coils is disposed within one of adjacent three of the slots. The adjacent three have disposed therein the slot-inserted conductor portions through which electrical currents flow in the same direction. Each of the phase coils is made up of a first, a second, and a third type of the conductor segments. The slot-inserted conductor portions of each of the conductor segments of the first type are spaced from each other at eight slot pitches. The slot-inserted conductor portions of each of the conductor segments of the second type are spaced from each other at nine slot pitches. The slot-inserted conductor portions of each of the conductor segments of the third type are spaced from each other at eleven slot pitches.

According to the fourth aspect of the invention, there is provided a sequentially joined-segment stator coil equipped rotary electrical machine which comprises: (a) a rotor having a plurality of pairs of magnetic poles; (b) a stator core having opposed ends, the stator core having formed therein a plurality of slots arrayed at a given pitch in a circumferential direction of the stator core, each of the slots defining therein a sequence of at least first to sixth conductor-inserted positions aligned in a radius direction of the stator core; and (c) a polyphase stator coil made up of a given number of phase windings each including a plurality of substantially U-shaped conductor segments joined in series. Each of the U-shaped conductor segments has a pair of legs which are disposed at different two of the conductor-inserted positions in two of the slots, respectively, and which are oriented within the slots toward the same end of the stator core. The legs of the U-shaped conductor segments are joined in pair to complete each of the phase windings.

The U-shaped conductor segments include lap winding segments in which end portions of the legs projecting from the slots extend so as to approach each other in the circumferential direction of the stator core and wave-segments in which end portions of the legs projecting from the slots extend away from each other in the circumferential direction of the stator core. The stator core has k(=natural number more than or equal to two) of the slots defining each of sets of same phase slots for each magnetic pole. The k slots are located adjacent each other in the circumferential direction of the stator core and have one of the phase windings extend therethrough. The k slots have slot series numbers which are defined in series in the circumferential direction of the stator core. Each of the phase windings includes a lap winding coil, a wave winding coil, and a connecting line connecting the lap winding coil and the wave winding coil. The lap winding coil is made up of a total of 2k single-lap winding coils connected in series each of which includes the wave-segment having the legs inserted into the first and fourth conductor-inserted positions in ones of the same phase slots of the same slot serial number in two of the sets of the same phase slots and the lap winding segment having the legs inserted into the second and third conductor-inserted positions in the same ones of the same phase slots as those of the wave-segment. The wave winding coil is made up of a total of 2k single-turn wave winding coils connected in series each of which includes the wave-segments connected in series each of which has the legs inserted into the fifth and sixth conductor-inserted positions in ones of the same phase slots of the same slot serial number in two of the sets of the same phase slots.

Specifically, the lap winding coil is made up of the 2k single-lap winding coils connected in series two of each are disposed in one of the same phase slots. The wave winding coil is made similar to the lap winding coil. The lap winding coil and the wave winding coil is connected in series to complete the stator coil in which the six conductor segments are aligned in each of the slots in the radius direction of the core.

The lap winding coil occupies consecutive four of the conductor-inserted positions aligned in the radius direction of the core. One of the same phase slots has two of the single-lap winding coils which extend in opposite directions. Similarly, the wave winding coil occupies consecutive two of the conductor-inserted positions aligned in the radius direction of the core. One of the same phase slots has two of the wave-shaped singe-lap winding coils which extend in opposite directions. This permits the lap winding coil having a double-segment overlap structure and the wave winding coil having a non-overlap structure to be arrayed adjacent to each other in the radius direction of the core and also permits the number of turns of the stator coil to be increased multiple times the number of the same phase slots. The lap winding coil and the wave winding coil may, however, be joined using the single connecting line, thus permitting the length of the segment head-side coil end in the axial direction of the core to be decreased as compared with conventional stator coils. This allows a total length of the rotary electrical machine to be decreased and results in decreases in reactive inductance and electric resistance of the stator coil to improve the efficiency and minimize the quantity of generated heat.

In the preferred mode of the invention, the lap winding coil is made up of a first sequence of series-connected k of the single-lap winding coils and a second sequence of series-connected k of the single-lap winding coils. The first and second sequences extend in opposite directions.

The wave winding coil is made up of a first sequence of series-connected k of the single-turn wave winding coils and a second sequence of series-connected k of the single-turn wave winding coils. The first and second sequences extend in opposite directions.

A directional turning connecting line is further provided which serves to establish a joint between the first and second sequences of the single-turn wave winding coils. The directional turning connecting line and ends of each of the phase windings lie within a range of two magnetic pole pitches.

According to the fifth aspect of the invention, there is provided a segment-joined coil for a rotary electrical machine which comprises: (a) a core having opposed ends, the core having formed therein a plurality of slots arrayed at a given pitch in a circumferential direction of the core; (b) and a polyphase stator coil made up of a given number of phase windings each including a first coil and a second coil connected in series or in parallel with each other. The first coil includes a plurality of first conductor segments each having a substantially U-shaped head and a first and a second leg extending form ends of the head. The first and second legs pass through two of the slots, respectively. Tips of the first and second legs are joined in series in pair to complete the first coil. The second coil includes a plurality of second conductor segments each having a head and a first and a second leg extending form ends of the head. The first and second legs pass through two of the slots, respectively. Tips of the first and second legs are joined in series in pair to complete the second coil.

The first leg of each of the first conductor segments of the first coil and the first leg of each of the second conductor segments of the second coil are disposed within a first one of the slots and arrayed adjacent to each other so that the first leg of the first conductor segment is located inside the first leg of the second conductor segment in a radius direction of the core. The second leg of each of the first conductor segments is disposed within a second one of the slots which is spaced from the first slot at substantially one magnetic pole pitch in the circumferential direction and located inside the first leg of the first conductor segment in the radius direction of the core. The second leg of each of the second conductor segments is disposed within a third one of the slots which is spaced from the first slot at substantially one magnetic pole pitch in the circumferential direction and located inside the first leg of the second conductor segment in the radius direction of the core.

Specifically, the same phase winding is broken down into the first and second coils which are disposed in different positions of the slots. For example, the first coil is located inside the second coil. Further, the first leg of each of the first conductor segments of the first coil and the first leg of each of the second conductor segments of the second coil are disposed within the same slot and arrayed so that the second legs of the first and second conductor segments are located on the same side from the first legs in the circumferential direction of the core. This prevents the first legs of the first and second conductor segments from rotating relative to each other during a segment head spreading step and a segment end spreading step of a coil production process, thus avoiding friction therebetween to minimize a drop in insulation capability of the conductor segments. Additionally, the structure also permits the first legs of the first and second conductor segments to be held in the same ring during the segment head spreading step and the segment end spreading step of the coil production process, thus resulting in a decrease in rings to be used in making the segment-joined coil.

According to the sixth aspect of the invention, there is provided a method of producing the above described segment-joined coil which comprises: (a) preparing a large ring having grooves or holes formed therein at a given pitch in a circumferential direction thereof, a middle ring having grooves or holes formed therein at the same pitch as that of the large ring, and a small ring having groove or holes formed therein at the same pitch as that of the middle ring, the middle ring being arranged inside the large ring, the small ring being arranged inside the middle ring; (b) preparing first and second conductor members for forming the first and second conductor segments, respectively, each of the first and second conductor members including a substantially U-shaped head and a first and a second leg extending form ends of the head; (c) fitting the first legs of the first and second conductor members within the grooves or holes of the middle ring; (d) fitting the second legs of the first conductor members within the grooves or holes of the small ring; (e) fitting the second legs of the second conductor members within the grooves or holes of the large ring; and (f) rotating the large and small rings in the same circumferential direction thereof relative to the middle ring through approximately one magnetic pole pitch to spread the heads of the first and second conductor members in the circumferential direction. This method offers the beneficial effects as described above.

In the preferred mode of the invention, the method further comprises (a) inserting the first and second legs of the spread first and second conductor members into the slots of the core from one of the ends of the core; (b) preparing a second large ring having grooves or holes formed therein at a given pitch in a circumferential direction thereof, a second middle ring having grooves or holes formed therein at the same pitch as that of the second large ring, and a second small ring having groove or holes formed therein at the same pitch as that of the second middle ring, the second middle ring being arranged inside the large ring, the second small ring being arranged inside the second middle ring; (c) fitting end portions of the first legs of the spread first and second conductor members projecting from the core within the grooves or holes of the second middle ring; (d) fitting end portions of the second legs of the spread first conductor members projecting from the core within the grooves or holes of the small ring; (e) fitting end portions the second legs of the second conductor members projecting from the core within the grooves or holes of the large ring; and (f) rotating the second large ring and the second small ring in the same circumferential direction thereof relative to the second middle ring through approximately one magnetic pole pitch to spread the end portions of the spread first and second conductor members in the circumferential direction to complete the first and second conductor segments, respectively.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
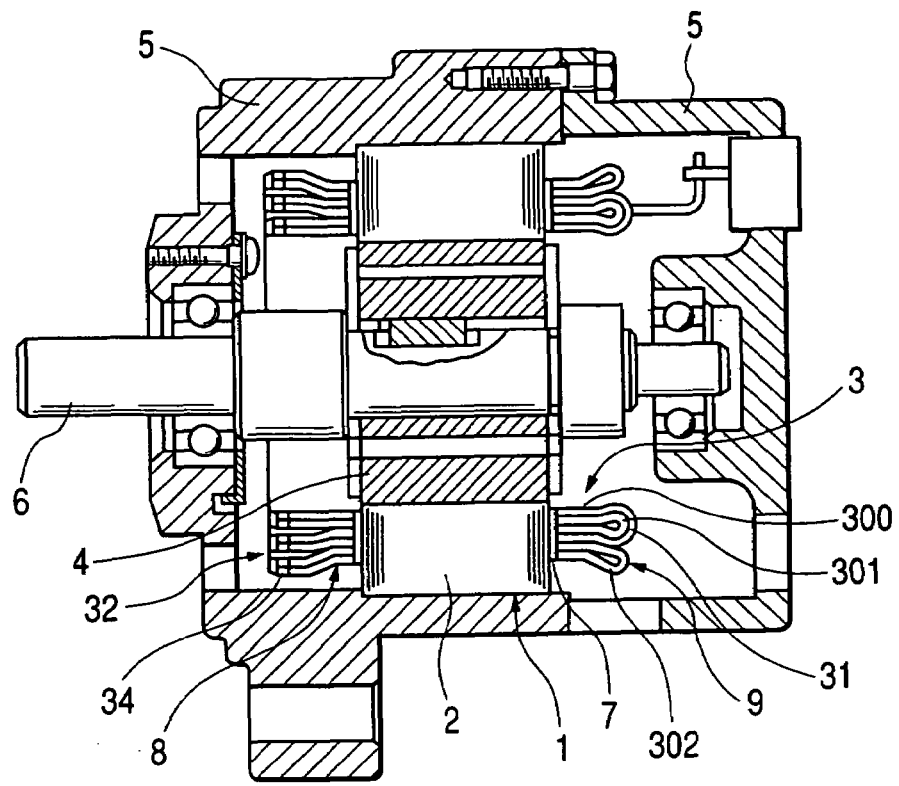
FIG. 1 is a longitudinal sectional view which shows a rotary electrical machine equipped with a stator coil according to the first embodiment of the invention.

Referring to the drawings, wherein like reference numbers refer to like parts in several views, particularly to FIG. 1, there is shown a high-voltage rotary electrical machine for automotive vehicles according to the first embodiment of the invention which is equipped with a sequentially joined-segment stator coil.

The rotary electrical machine consists essentially of a stator 1, a stator core 2, a stator coil 3, a rotor 4, a housing 5, and a rotary shaft 6.

The stator 1 is fixed to an inner peripheral wall of the housing 5. The rotary shaft 6 on which the rotor 4 is fitted is retained rotatably by end walls of the housing 5 through a pair of bearings and coupled to, for example, an automotive engine (not shown) through a pulley and a belt (not shown).

The rotor 4 has permanent magnets installed in an outer peripheral wall thereof at a given angular interval so as to have opposite magnetic poles oriented alternately. The rotary electrical machine, as discussed therein, is a permanent magnet three-phase brushless DC motor (synchronous motor). The rotor structure may be a variety of know structure such as a rundel pole core structure. Such a structure is well known in the art, and explanation thereof in detail will be omitted here.

The stator 1 includes the core 2, the stator coil 3 formed by a three-phase star-connected winding, and insulators 7. The core 2, as clearly shown in FIG. 2, has formed thereon teeth 800 which define equi-angular spaced slots 700. The stator coil 3 is made up of sequentially joined conductor segments inserted into the slots 700. The insulators 7 works to insulate the conductor segments from the core 2. Such a structure is know in, for example, U.S. Pat. Nos. 6,201,332 B1, 6,249,956 B1, and 6,404,091 B1, all assigned to the same assignee as that of this application, disclosure of which is incorporated therein by reference.

Figure 2:
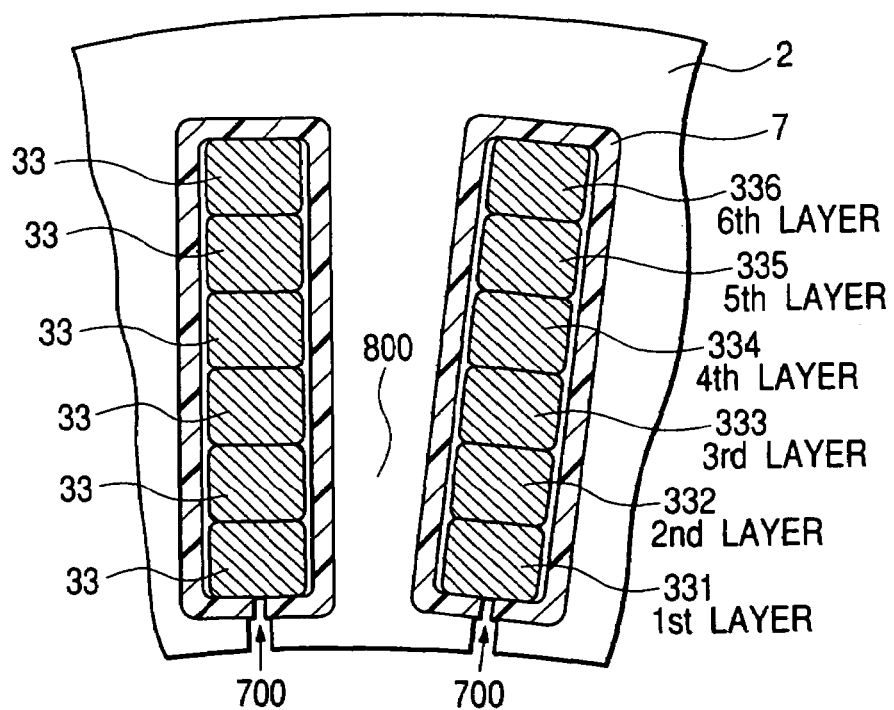
FIG. 2 is an enlarged partial view which shows arrays of conductor segments within slots of a stator core.

FIG. 2 is a partially sectional view of the stator 1 as taken in a radius direction thereof. The slots 700 of a number that is an integral multiple of eighteen (18) are formed in an inner peripheral wall of the stator core 2.

Figure 9:
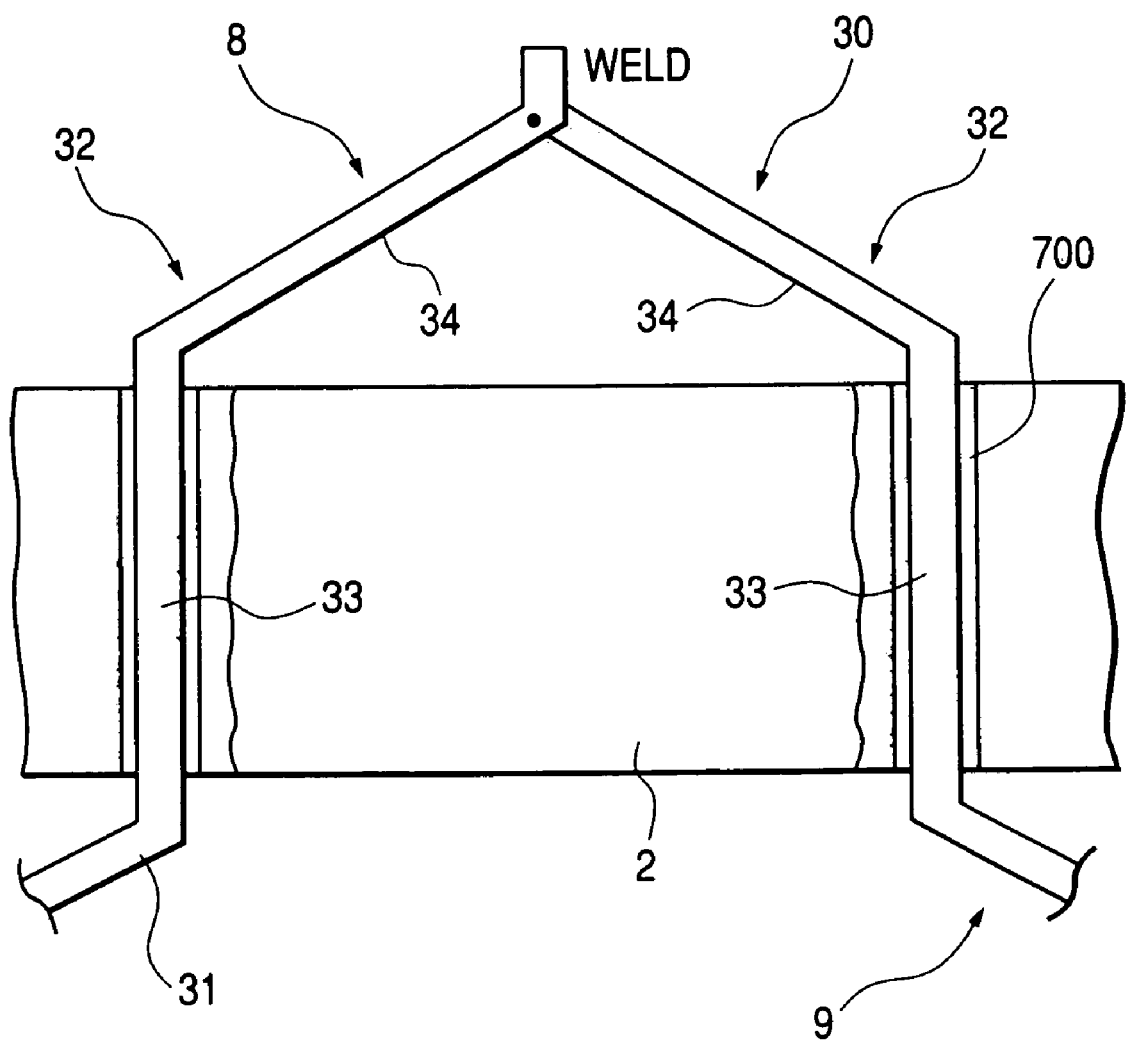
FIG. 9 is a plane view which shows a conductor segment of a stator coil.

The stator coil 3 is made up of a plurality of conductor segments 30, as illustrated in FIG. 9, which are partially inserted into the slots 700 from the right to left, as viewed in FIG. 1. Each end of the conductor segments 30 is welded to one of the ends of another conductor segment 30 to form three phase coils (will also be referred to as U-phase, V-phase, and W-phase coils below) which are coupled together to form the so-called three-phase star-connected winding. The U-phase, V-phase, and W-phase coils may alternatively be joined together through the so-called delta connection.

Each of the conductor segments 30 is, as clearly shown in FIG. 9, made up of a U-shaped head 31 (half is illustrated) and a pair of legs 32 extending from ends of the head 31. The head 31 may alternatively have substantially a V-shape. Each of the legs 32 consists of a side conductor portion 33 inserted into the slot 700 and end portions 34. Each of the end portions 34 projects from a front end of the core 2 and is inclined to a circumferential direction of the core 2. Each of the end portions 34 is welded to one of the end portions 34 of another conductor segment 30 to form a segment end-side coil end 8. The head 31 of each of the conductor segments 30 projects from a rear end of the core 2 to form a segment head-side coil end 9.

Within each of the slots 700, six of the side conductor portions 33 are arrayed in line or aligned in the radius direction of the core 2. In the following discussion, the six side conductor portions 33 inserted into each of the slots 700 will also be referred to as a first, a second, a third, a fourth, a fifth, and a sixth layer, respectively, from inside to outside of the core 2. Specifically, the innermost one of the side conductor portions 33 inserted into each of the slots 700 forms the first layer, the second innermost one forms the second layer, the third innermost one forms the third layer, the outermost one forms the sixth layer, the second outermost one forms the fifth layer, and the third outermost one forms the fourth layer. The locations of the first to sixth layers in each of the slots 700 will also be referred to as first, second, third, fourth, fifth, and sixth layer positions below. The side conductor portions 33 forming the first to sixth layers will also be designated below at reference numerals 331, 332, 333, 334, 335, and 336, respectively. The two side conductor portions 33 of each of the conductor segments 30 are inserted into two of the slots 700 spaced from one another at an interval of a magnetic pole pitch (i.e., an electrical angle π), respectively, and placed in different layer positions in the slots 700.

Figure 10:
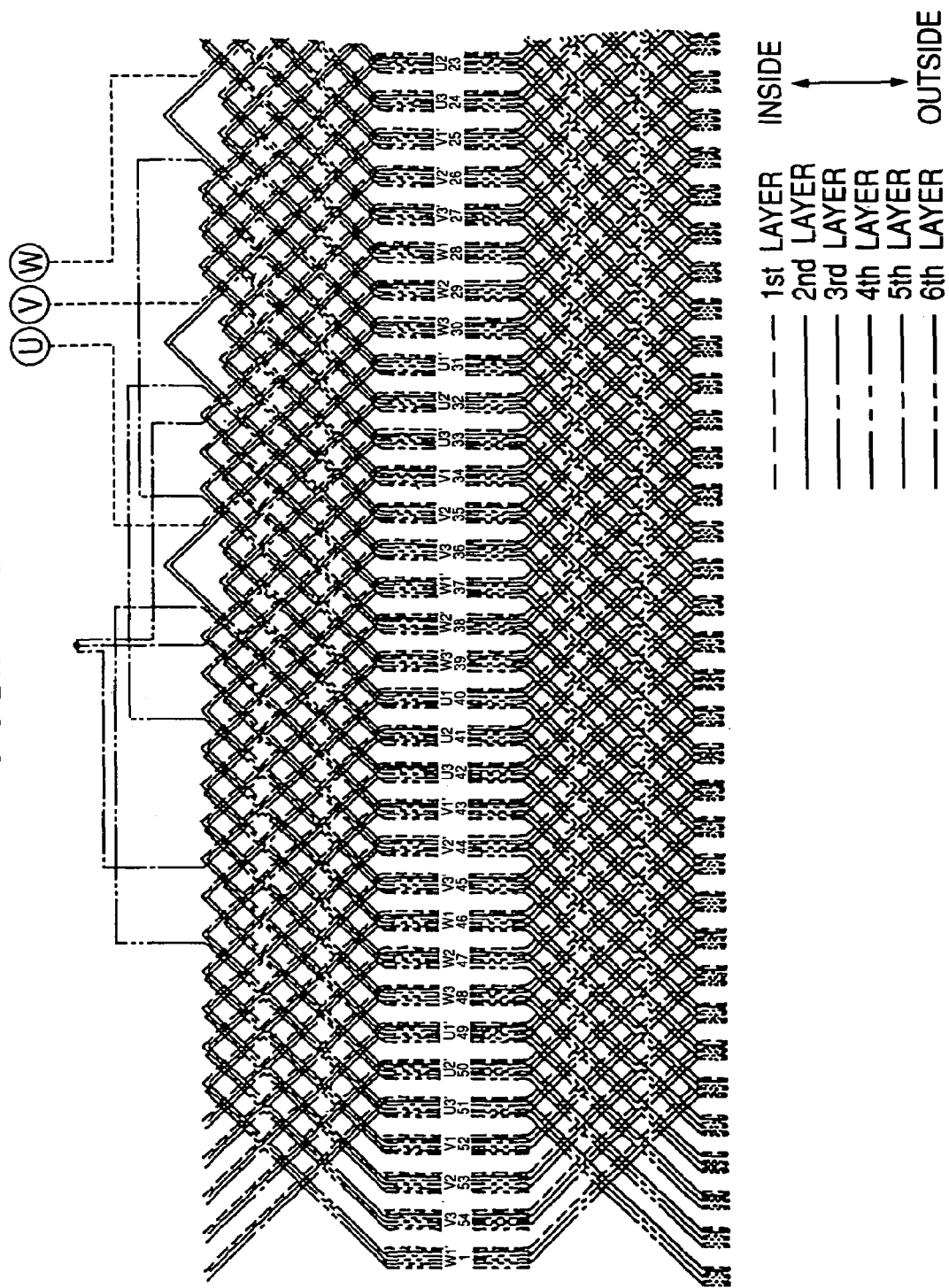
FIG. 10 is a partial development which shows a portion of a U-phase coil.
Figure 11:
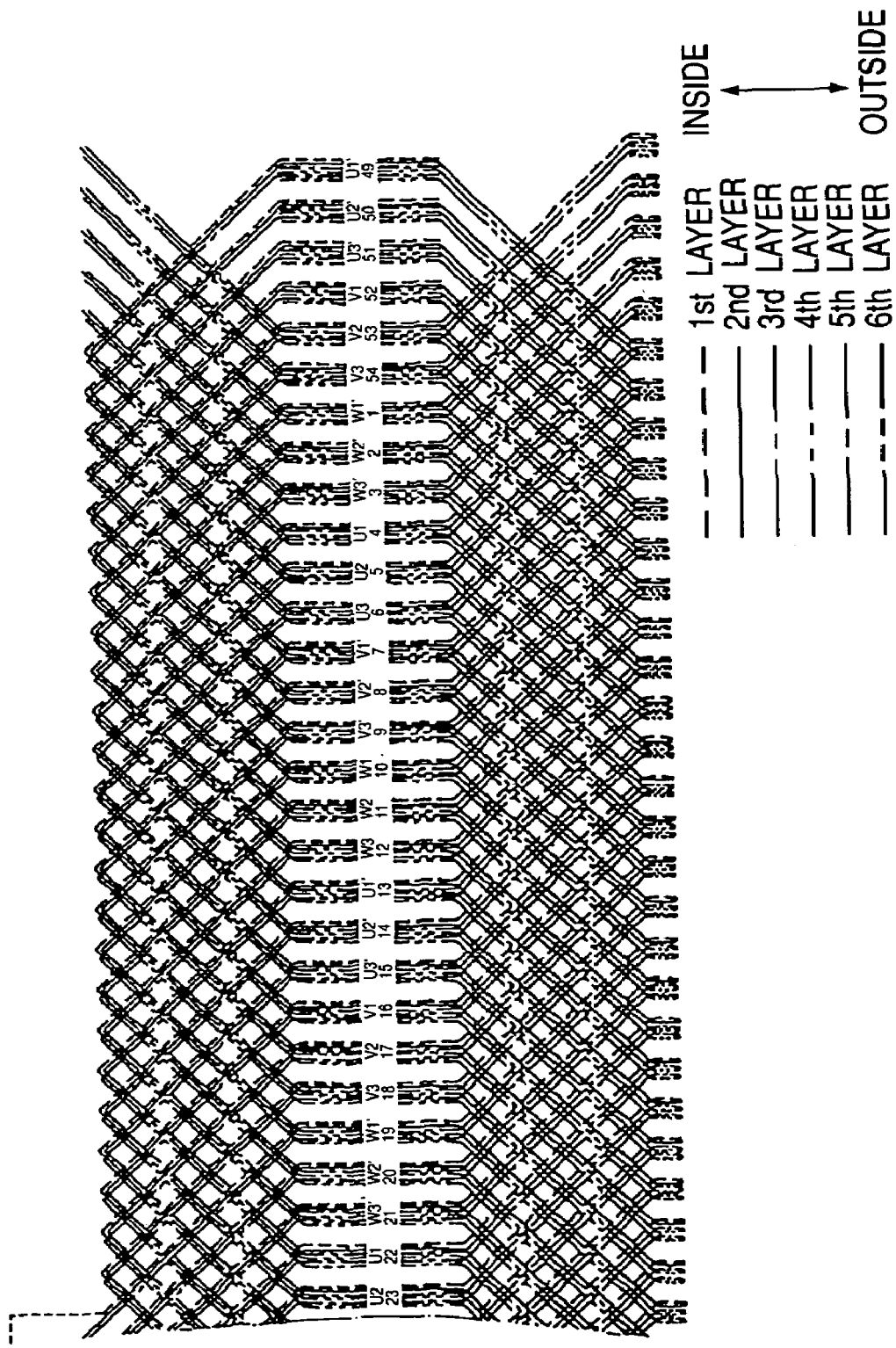
FIG. 11 is a partial development which shows another portion of the U-phase coil as illustrated in FIG. 10.

The structure of the stator coil 3 will be described below in detail with reference to FIGS. 3 to 8. The U-phase, V-phase, and W-phase coils forming the three-phase star-connected winding are identical in structure with each other and different only in location in the circumferential direction of the core 2. For the brevity of disclosure, only the U-phase coil will be discussed below. FIGS. 10 and 11 are development elevations of the U-phase coil.

The side conductor portions 33 of the conductor segments 30 of the same phase coil are disposed within adjacent three of the slots 700. In an example illustrated in FIGS. 3 to 8, the total number of the slots 700 is 54. The side conductor portions 33 of the conductor segment 30 of the U-phase coil are disposed within the slots 700 of numbers #4-#6, #13-#15, #22-#24, #31-#33, #40-#42, and #49-#51. These slots will also be referred to as U-phase slots below. The side conductor portions 33 of the conductor segment 30 of the V-phase coil are disposed within the slots 700 of numbers #7-#9, #16-#18, #25-#27, #34-#36, #43-#45, and #52-#54. These slots will also be referred to as V-phase slots below. The side conductor portions 33 of the conductor segment 30 of the W-phase coil are disposed within the slots 700 of numbers #1-#3, #10-#12, #19-#21, #28-#30, #37-#39, and #46-#48. These slots will also be referred to as W-phase slots below. Note that FIGS. 3 to 8 indicate only a part of the slot numbers for the brevity of illustration.

Figure 3:
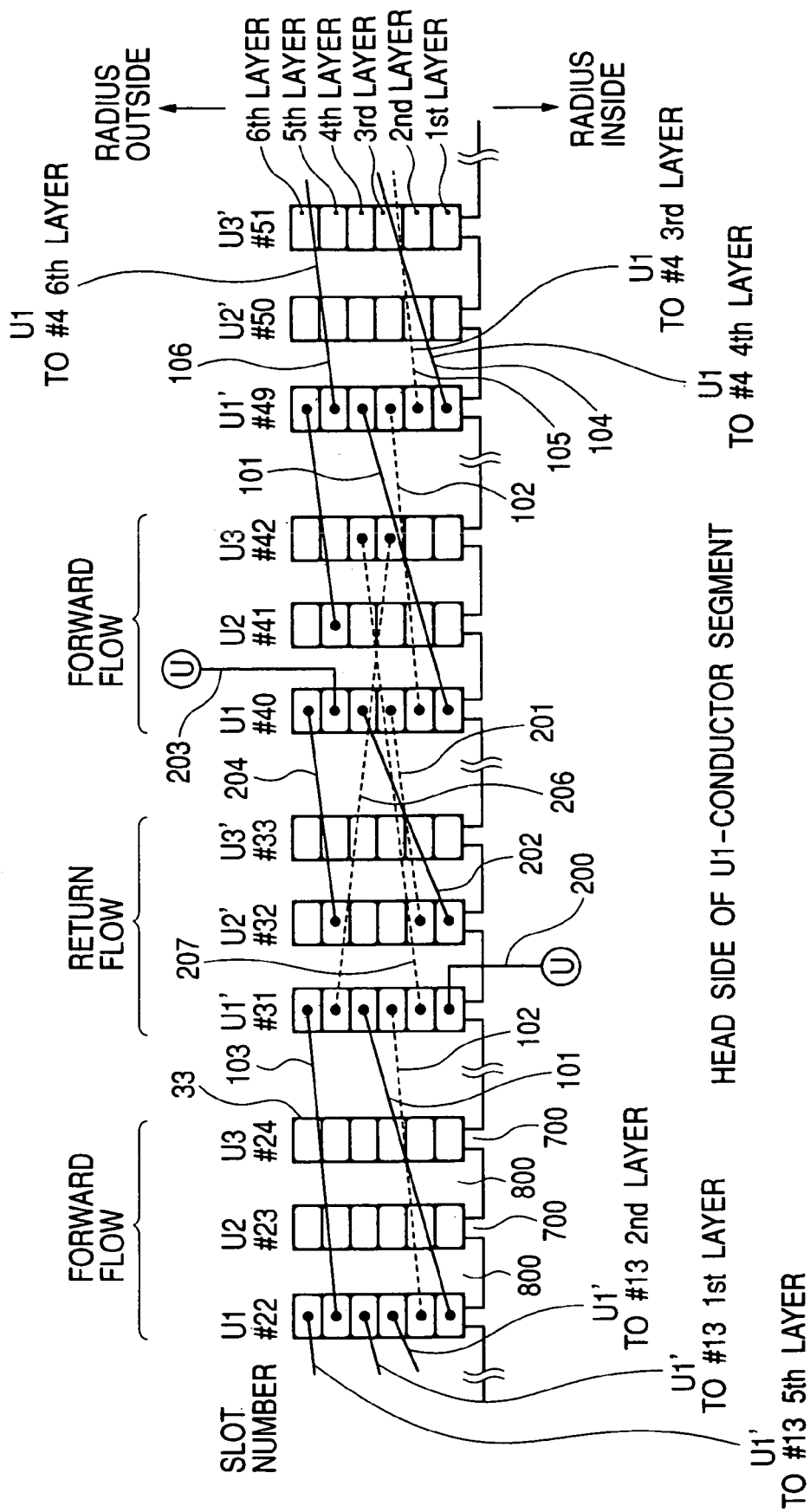
FIG. 3 is a partial development which shows an arrangement of heads of U1-conductor segments.
Figure 4:
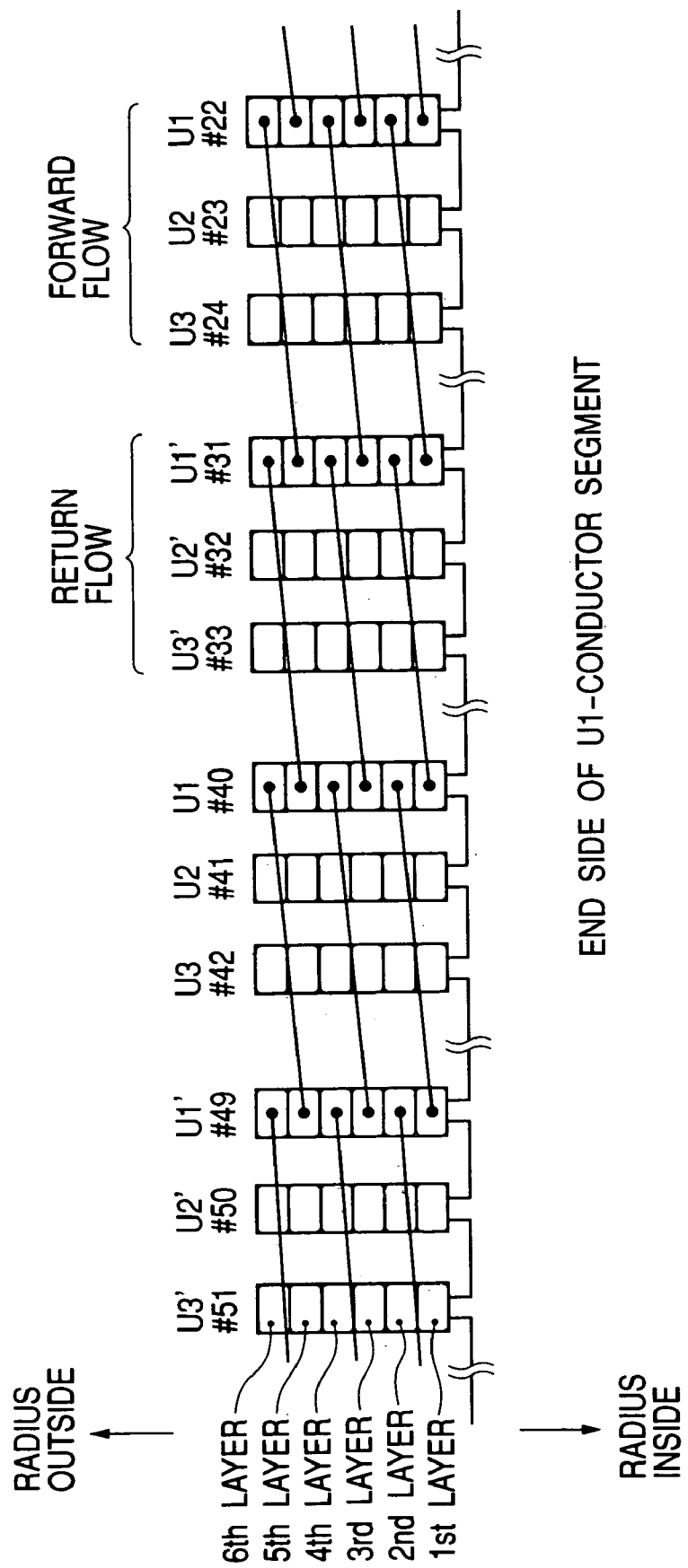
FIG. 4 is a partial development which shows an arrangement of projecting ends of U1-conductor segments.
Figure 5:
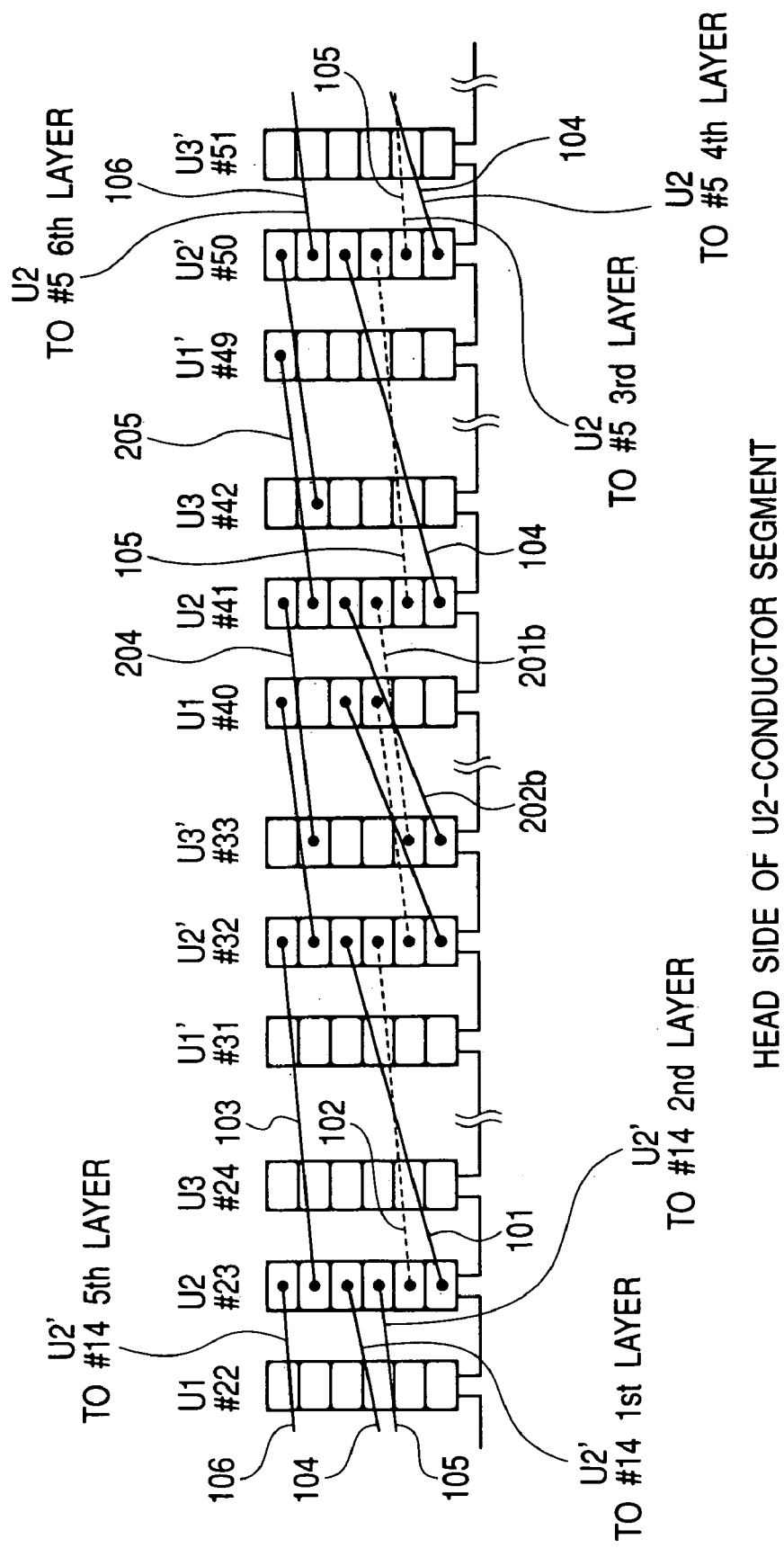
FIG. 5 is a partial development which shows an arrangement of heads of U2-conductor segments.
Figure 7:
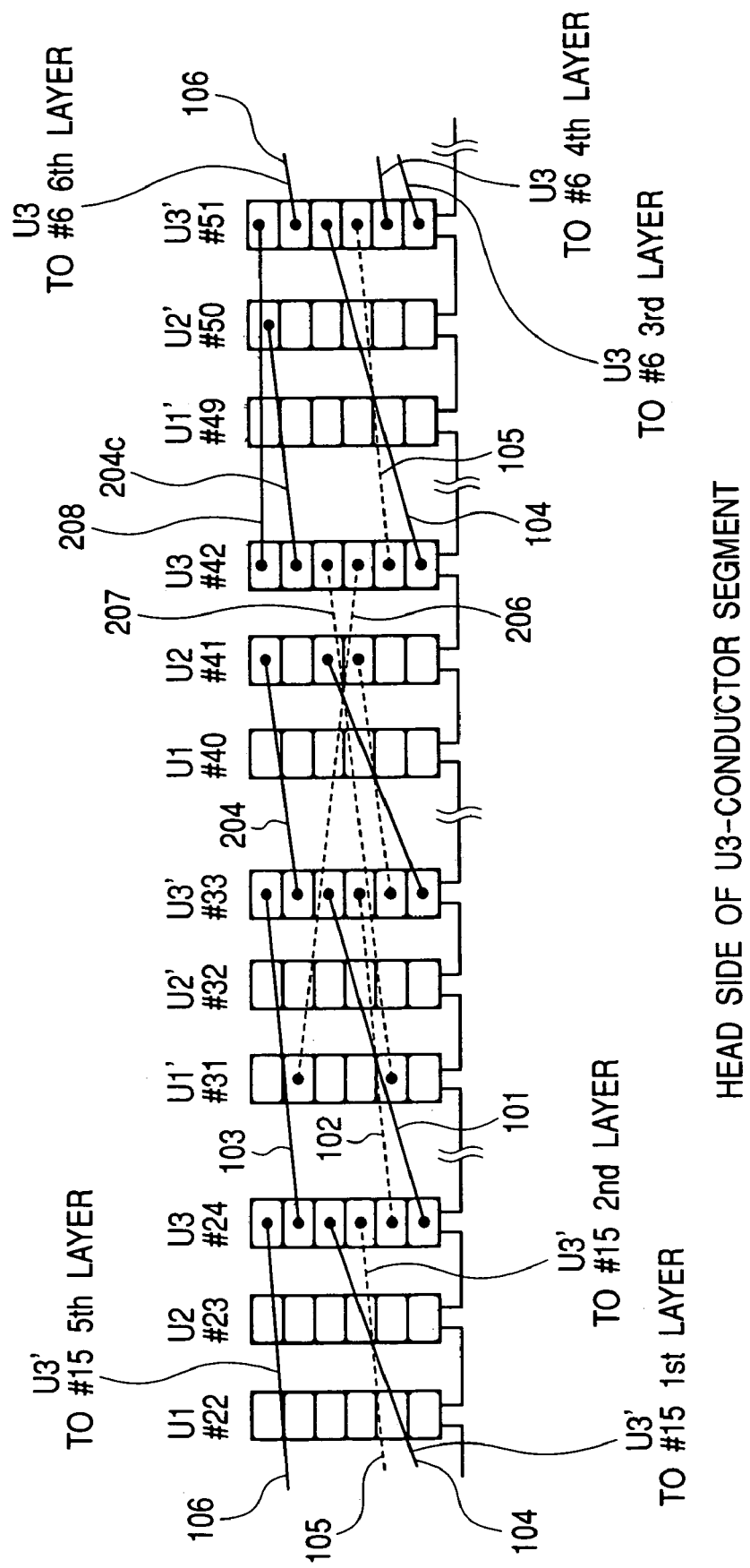
FIG. 7 is a partial development which shows an arrangement of heads of U3-conductor segments.
Figure 8:
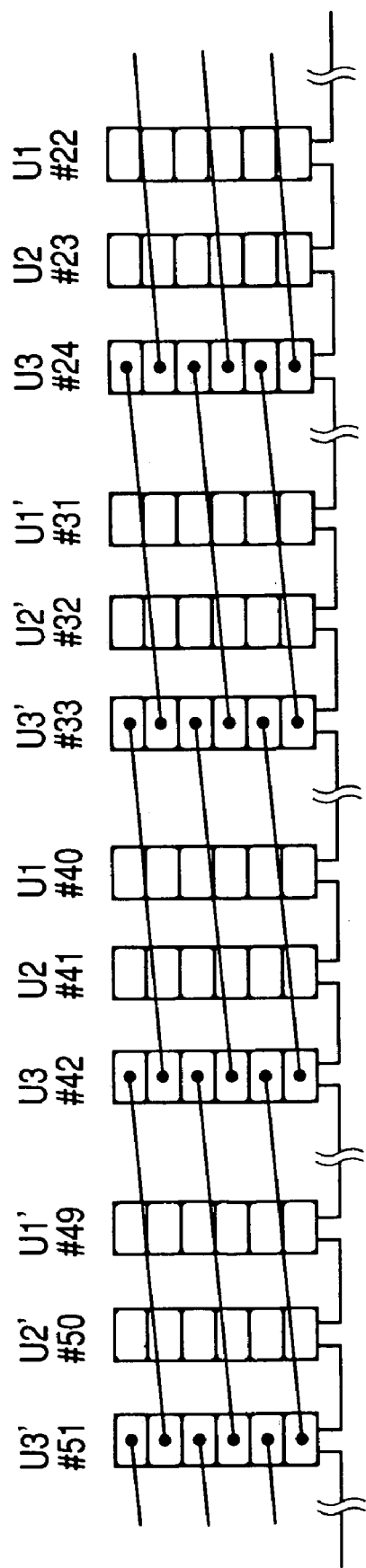
FIG. 8 is a partial development which shows an arrangement of projecting ends of U3-conductor segments.

FIGS. 3, 5, and 7 are partially side illustrations of the segment head-side coil end 9, as viewed from the rotational axial direction of the core 2, which show arrangements of the heads 31 and the side conductor portions 33 of the conductor segments 30. FIGS. 4, 5, and 8 are partially side illustrations of the segment end-side coil end 8, as viewed from the rotational axial direction of the core 2, which show arrangements of the projecting ends 34 and the side conductor portions 33 of the conductor segments 30.

The slots #22 to #24, and #40 to #42 define forward flow conductor slots within which the side conductor portions 33 of the conductor segments 30 are disposed through which a U-phase current flows in a forward direction, that is, from front to back surface of the drawings, which will also be referred to as forward flow side conductor portions below. The slots #31 to #33, and #49 to #51 define return flow conductor slots within which the side conductor portions 33 of the conductor segments 30 are disposed through which the U-phase current returns, that is, flows in a rearward direction from back to front surface of the drawings, which will also be referred to as return flow side conductor portions below. Specifically, one of the pair of side conductor portions 33 of each of the conductor segments 30 is the forward flow side conductor portion, while the other side conductor portion 33 is the return flow side conductor portion.

U1 denotes a leftmost one of adjacent three of the slots 700 within which the forward flow side conductor portions 33 of the same phase are disposed (i.e., the smallest of the slot numbers among three). U2 denotes the middle slot 700. U3 denotes the rightmost slot 700. Similarly, U1' denotes a leftmost one of adjacent three of the slots 700 within which the return flow side conductor portions 30 of the same phase are disposed (i.e., the smallest of the slot numbers among three). U2' denotes the middle slot 700. U3' denotes the rightmost slot 700. The U-phase coil is formed by connecting the conductor segments 30 disposed within the slots U1, U2, U3, U1', U2', and U3' in series.

However, in this embodiment, some of the conductor segments 30 (will also be referred to as special U-phase conductor segments below) disposed in either of the slots #40, #41, and #42 or in the first layer position of the slot #31 is different in shape and location from the other conductor segments 30 (will also be referred to as standard U-phase conductor segments below). The special U-phase conductor segments are used to join given sets of the standard U-phase conductor segments in series to complete the U-phase coil and also to form U-phase coil terminals and a neutral point terminal.

Standard U-Phase Conductor Segment

The standard U-phase conductor segments are provided by three types of the conductor segments 30: one (will also be referred to as a U1-conductor segment below) having one of the side conductor portions 33 inserted into the forward flow conductor slot U1 and the other side conductor portions 33 inserted into the return flow conductor slot U1', the second (will also be referred to as a U2-conductor segment below) having one of the side conductor portions 33 inserted into the forward flow conductor slot U2 and the other side conductor portion 33 inserted into the return flow conductor slot U2', and the third (will also be referred to as a U3-conductor segment below) having one of the side conductor portions 33 inserted into the forward flow conductor slot U3 and the other side conductor portion 33 inserted into the return flow conductor slot U3'.

The U1-conductor segments are joined in series to make a U1-coil. The U2-conductor segments are joined in series to make a U2-coil. The U3-conductor segments are joined in series to make a U3-coil. The U1-, U2-, and U3-coils are joined to make the U-phase coil.

The arrangements of the U1-conductor segments are illustrated in FIGS. 3 and 4. The U1-conductor segments are provided by six types of the conductor segments 30 (designated at numerals 101 to 106 in FIG. 3) each of which has the side conductor portions 33 spaced from each other at an angular interval equivalent to nine slot pitches.

The U1-conductor segments 101 each have the forward flow side conductor portion disposed at the first layer position of the forward flow conductor slot U1 (e.g., slot #22) and the return flow side conductor portion disposed at the fourth layer position of the return flow conductor slot U1' (e.g., slot #31). The U2-conductor segments 102 each have the forward flow side conductor portion disposed at the second layer position of the forward flow conductor slot U1 (e.g., slot #22) and the return flow side conductor portion disposed at the third layer position of the return flow conductor slot U1' (e.g., slot #31). The U1-conductor segments 103 each have the forward flow side conductor portion disposed at the fifth layer position of the forward flow conductor slot U1 (e.g., slot #22) and the return flow side conductor portion disposed at the sixth layer position of the return flow conductor slot U1' (e.g., slot #31).

Similarly, the U1-conductor segments 104 each have the return flow side conductor portion disposed at the first layer position of the return flow conductor slot U1' (e.g., slot #49) and the forward flow side conductor portion disposed at the fourth layer position of the forward flow conductor slot U1 (e.g., slot #4). The U2-conductor segments 105 each have the return flow side conductor portion disposed at the second layer position of the return flow conductor slot U1' (e.g., slot #49) and the forward flow side conductor portion disposed at the third layer position of the forward flow conductor slot U1 (e.g., slot #4). The U1-conductor segments 106 each have the return flow side conductor portion disposed at the fifth layer position of the return flow conductor slot U1' (e.g., slot #49) and the forward flow side conductor portion disposed at the sixth layer position of the forward flow conductor slot U1 (e.g., slot #4).

The U1-conductor segments 101 and 104, the U1-conductor segments 102 and 105, the U1-conductor segments 103 and 106 are identical in shape with each other, respectively.

Each of the forward flow side conductor portions of the U1-conductor segments 101 to 103 disposed at the first, second, and fifth layer positions forms one of the conductor segments 30 along with one of the return flow side conductor portions disposed at the fourth, third, and sixth layer positions of the return flow conductor slots whose slot numbers are greater. Each of the return flow side conductor portions of the U1-conductor segments 104 to 106 disposed at the first, second, and fifth layer positions forms one of the conductor segments 30 along with one of the forward flow side conductor portions disposed at the fourth, third, and sixth layer positions of the forward flow conductor slots whose slot numbers are greater.

The segment end-side coil end 8 made up of the projecting end portions 34 of the U1-conductor segments 101 to 106 is illustrated in FIG. 4.

The end portion 34 continuing from the forward flow side conductor portion emerging from the first layer position of the forward flow conductor slot U1 is welded to the end portion 34 continuing from the return flow side conductor portion emerging from the second layer position of the return flow conductor slot U1' whose slot number is smaller.

The end portion 34 continuing from the forward flow side conductor portion emerging from the second layer position of the forward flow conductor slot U1 is welded to the end portion 34 continuing from the return flow side conductor portion emerging from the first layer position of the return flow conductor slot U1' whose slot number is greater.

The end portion 34 continuing from the forward flow side conductor portion emerging from the third layer position of the forward flow conductor slot U1 is welded to the end portion 34 continuing from the return flow side conductor portion emerging from the fourth layer position of the return flow conductor slot U1' whose slot number is smaller.

The end portion 34 continuing from the forward flow side conductor portion emerging from the fourth layer position of the forward flow conductor slot U1 is welded to the end portion 34 continuing from the return flow side conductor portion emerging from the third layer position of the return flow conductor slot U1' whose slot number is greater.

The end portion 34 continuing from the forward flow side conductor portion emerging from the fifth layer position of the forward flow conductor slot U1 is welded to the end portion 34 continuing from the return flow side conductor portion emerging from the sixth layer position of the return flow conductor slot U1' whose slot number is smaller.

The end portion 34 continuing from the forward flow side conductor portion emerging from the sixth layer position of the forward flow conductor slot U1 is welded to the end portion 34 continuing from the return flow side conductor portion emerging from the fifth layer position of the return flow conductor slot U1' whose slot number is greater.

The U1-conductor segments 101 to 106 are joined sequentially in the above manner to make sections of the U1-coil (will also be referred to as U1-coil sections below) that is the part of the standard U-phase coil. Specifically, the U1-conductor segments 101, 102, 104, and 105 are joined in series to form some of the U1-coil sections. The U1-conductor segments 103 and 106 are joined in series to form the remainder of the U1-coil sections.

More specifically, the U1-coil sections formed by the U1-conductor segments 101, 102, 104, and 105 are provided by a first and a second U1-coil section. The first U1-coil section is made up of series-connected groups each consisting of the return flow side conductor portion (fourth layer) of the U1-conductor segment 101, the forward flow side conductor portion (first layer) of the U1-conductor segment 101, the return flow side conductor portion (second layer) of the U1-conductor segment 105, the forward flow side conductor portion (third layer) of the U1-conductor segment 105, and the return flow side conductor portion (fourth layer) of another U1-conductor segment 101. The second U1-coil section is made up of series-connected groups each consisting of the forward flow side conductor portion (fourth layer) of the U1-conductor segment 104, the return flow side conductor portion (first layer) of the U1-conductor segment 104, the forward flow side conductor portion (second layer) of the U1-conductor segment 102, the return flow side conductor portion (third layer) of the U1-conductor segment 102, and the forward flow side conductor portion (fourth layer) of the another U1-conductor segment 104.

The U1-coil sections formed by the U1-conductor segments 103 and 106 are provided by a third and a fourth U1-coil section. The third U1-coil section is made up of series-connected groups each consisting of the return flow side conductor portion (sixth layer) of the U1-conductor segment 103, the forward flow conductor side conductor portion (fifth layer) of the U1-conductor segment 103, the return flow side conductor portion (sixth layer) of the another U1-conductor segment 103. The fourth U1-coil section is made up of series-connected groups each consisting of the return flow side conductor portion (sixth layer) of the U1-conductor segment 106, the forward flow side conductor portion (fifth layer) of the U1-conductor segment 106, the return flow side conductor portion (sixth layer) of the another U1-conductor segment 106.

Figure 6:
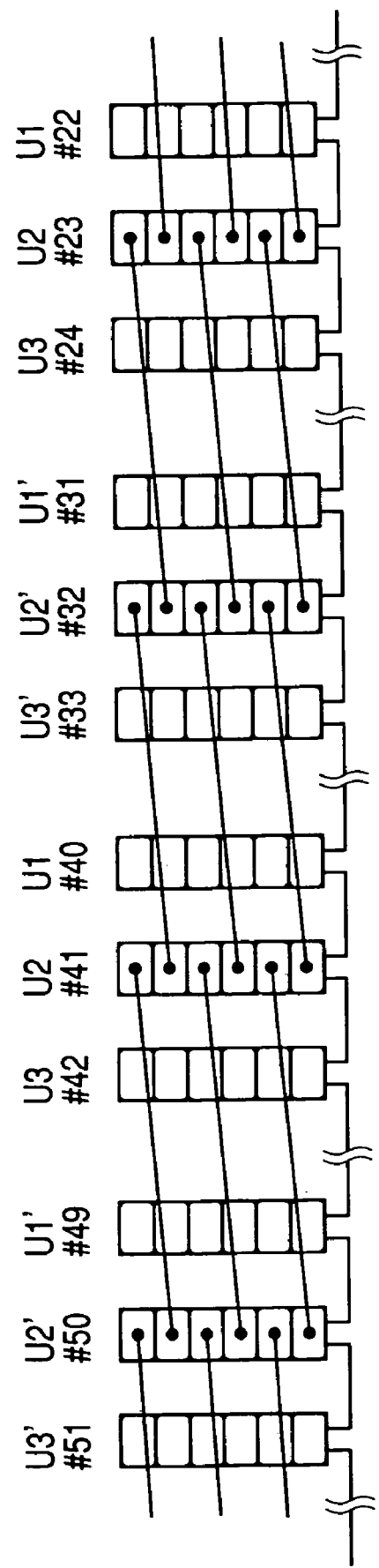
FIG. 6 is a partial development which shows an arrangement of projecting ends of U2-conductor segments.

The arrangements of the U2-conductor segments are illustrated in FIGS. 5 and 6. The U2-conductor segments are, like the U1-conductor segments as described above, provided by six types of the conductor segments 30 (designated at numerals 101 to 106 in FIG. 5) each of which has the side conductor portions 33 inserted into the forward flow conductor slots U2 and the return flow conductor slots U2' spaced from each other at nine slot pitches. Specifically, the U2-conductor segments are, as can be seen from a comparison between FIGS. 3 and 5, identical in structure with the U1-conductor segments. Explanation thereof in detail will thus be omitted here.

The arrangements of the U3-conductor segments are illustrated in FIGS. 7 and 8. The U3-conductor segments are, like the U1-conductor segments as described above, provided by six types of the conductor segments 30 (designated at numerals 101 to 106 in FIG. 7) each of which has the side conductor portions 33 inserted into the forward flow conductor slots U3 and the return flow conductor slots U3' spaced from each other at nine slot pitches. Specifically, the U3-conductor segments are, as can be seen from a comparison between FIGS. 3 and 7, identical in structure with the U1-conductor segments. Explanation thereof in detail will thus be omitted here.

Special U-Phase Conductor Segment Disposed in First Layer Position of Slot #31

Referring back to FIG. 3, the L-shaped conductor segment 200 has the return flow side conductor portion 33 disposed at the first layer position of the slot #31 and the other end forming an end of the U-phase coil.

Special U-Phase Conductor Segment Having Forward Flow Conductor Side Conductor Portion Disposed in Slot #40

The U-shaped conductor segment 201, as shown in FIG. 3, has the forward flow side conductor portion fitted in the third layer position of the slot #40 and the return flow side conductor portion fitted in the second layer position of the slot #32.

The U-shaped conductor segment 202 has the forward flow side conductor portion fitted in the fourth layer position of the slot #40 and the return flow side conductor portion fitted in the first layer position of the slot #32.

The L-shaped conductor segment 203 has the forward flow side conductor portion fitted in the fifth layer position of the slot #40 and the other end forming the other end of the U-phase coil.

The U-shaped conductor segment 204 has the forward flow side conductor portion fitted in the sixth layer position of the slot #40 and the return flow side conductor portion fitted in the fifth layer position of the slot #32.

Specifically, the U-phase conductor segments 201, 202, and 204 are inserted into the slots #40 and #32 spaced from each other at an angular interval equivalent to eight slot pitches which is shorter than that of the standard U-phase conductor segments by one pitch.

Special U-Phase Conductor Segment Having Forward Flow Conductor Side Conductor Portion Disposed in Slot #41

The U-shaped conductor segment 201b, as shown in FIG. 5, has the forward flow side conductor portion fitted in the third layer position of the slot #41 and the return flow side conductor portion fitted in the second layer position of the slot #33.

The U-shaped conductor segment 202b has the forward flow side conductor portion fitted in the fourth layer position of the slot #41 and the return flow side conductor portion fitted in the first layer position of the slot #33.

The U-shaped conductor segment 204b has the forward flow side conductor portion fitted in the sixth layer position of the slot #41 and the return flow side conductor portion fitted in the fifth layer position of the slot #33.

The L-shaped conductor segment 205 is identical in configuration with the special U-phase conductor segment 204 as illustrated in FIG. 3 and has the forward flow side conductor portion fitted in the fifth layer position of the slot #41 and the return flow side conductor portion fitted in the sixth layer position of the slot #49.

Specifically, the U-phase conductor segments 201b, 202b, and 204b are inserted into the slots #41 and #33 spaced from each other at an angular interval equivalent to eight slot pitches which is shorter than that of the standard U-phase conductor segments by one slot pitch. Similarly, the U-phase conductor segment 205 is also inserted into the slots #41 and #49 spaced from each other at an angular interval equivalent to eight slot pitches.

Special U-Phase Conductor Segment Having Forward Flow Conductor Side Conductor Portion Disposed in Slot #42

The U-shaped conductor segment 206, as shown in FIG. 7, has the forward flow side conductor portion fitted in the third layer position of the slot #42 and the return flow side conductor portion fitted in the fifth layer position of the slot #31.

The U-shaped conductor segment 207 has the forward flow side conductor portion fitted in the fourth layer position of the slot #42 and the return flow side conductor portion fitted in the second layer position of the slot #31.

The L-shaped conductor segment 204c has the forward flow side conductor portion fitted in the fifth layer position of the slot #42 and the return flow side conductor portion fitted in the sixth layer position of the slot #50.

The U-shaped conductor segment 208 has the forward flow side conductor portion fitted in the sixth layer position of the slot #42 and the return flow side conductor portion fitted in the sixth layer position of the slot #51.

Specifically, the U-phase conductor segments 206 and 207 are inserted into the slots #42 and #31 spaced from each other at an angular interval equivalent to eleven slot pitches which is longer than that of the standard U-phase conductor segments by two slot pitch. The U-phase conductor segment 208 is inserted into the slots #42 and #51 spaced from each other at the same angular interval as that of the standard U-phase conductor segments (i.e., nine slot pitches), but has the forward flow side conductor portion and the return flow side conductor portion disposed at the layer positions of the same number, thus having no twist in the radius direction. The U-phase conductor segment 204c is inserted into the slots #42 and #50 spaced from each other at an angular interval equivalent to eight slot pitches that is shorter than that of the standard U-phase conductor segments by one slot pitch.

As apparent from the above discussion, the first to fourth U1-coil sections made up of the U1-conductor segments (i.e., a first part of the standard U-phase conductor segments) serving to form the U1-coil, the first to fourth U2-coil sections made up of the U2-conductor segments (i.e., a second part of the standard U-phase conductor segments), and the first to fourth U3-coil sections made up of the U3-conductor segments (i.e., a third part of the standard U-phase conductor segments) serving to form the U3-coil are joined together through the above described special U-phase conductor segments 200 to 208 to complete the U-phase coil. The V- and W-phase coils are identical in structure with the U-phase coil, and explanation thereof in detail will be omitted here.

Second Embodiment

Figure 12:
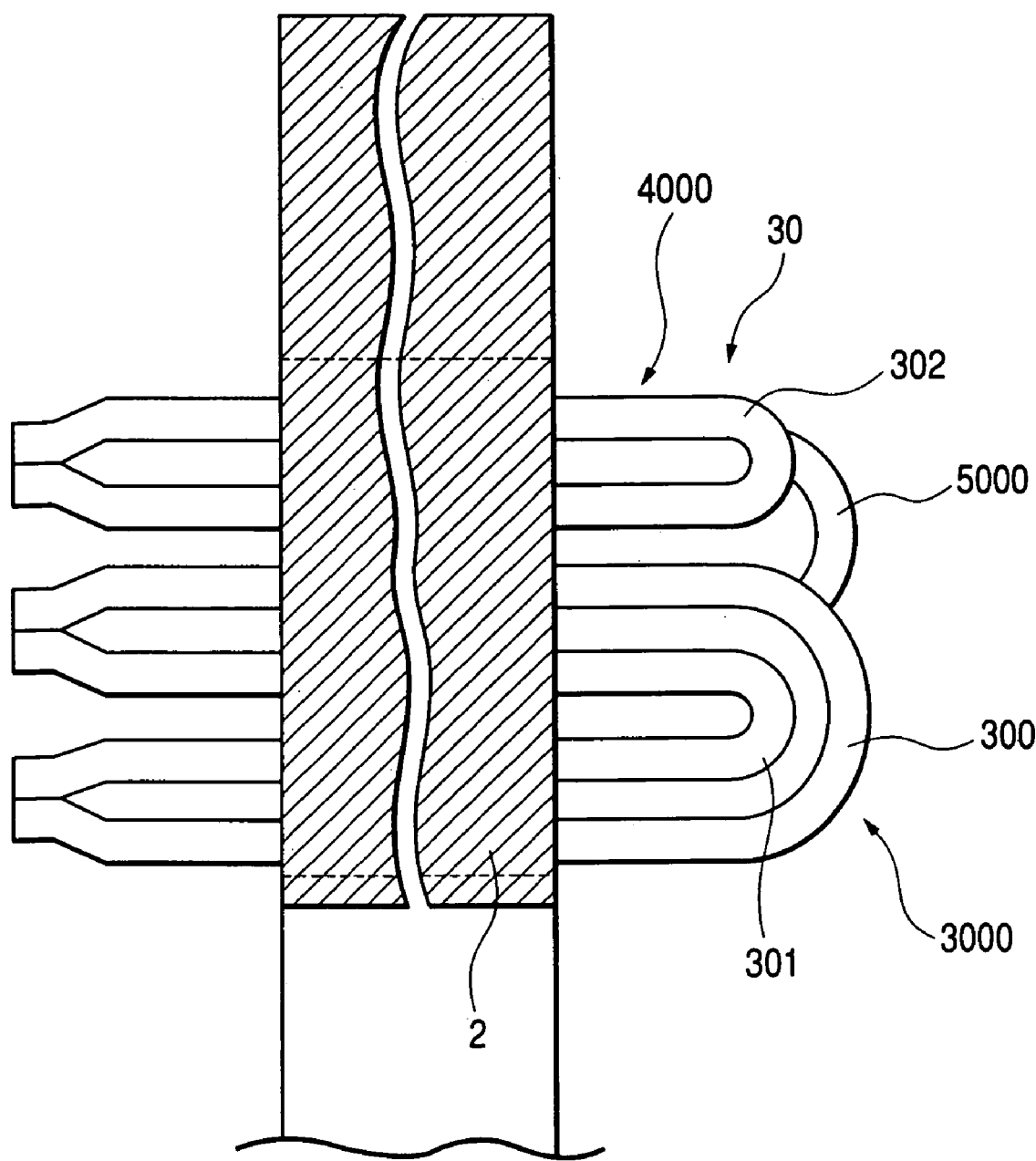
FIG. 12 is a longitudinal enlarged sectional view which shows a stator coil wound around a core according to the second embodiment of the invention.
Figure 13:
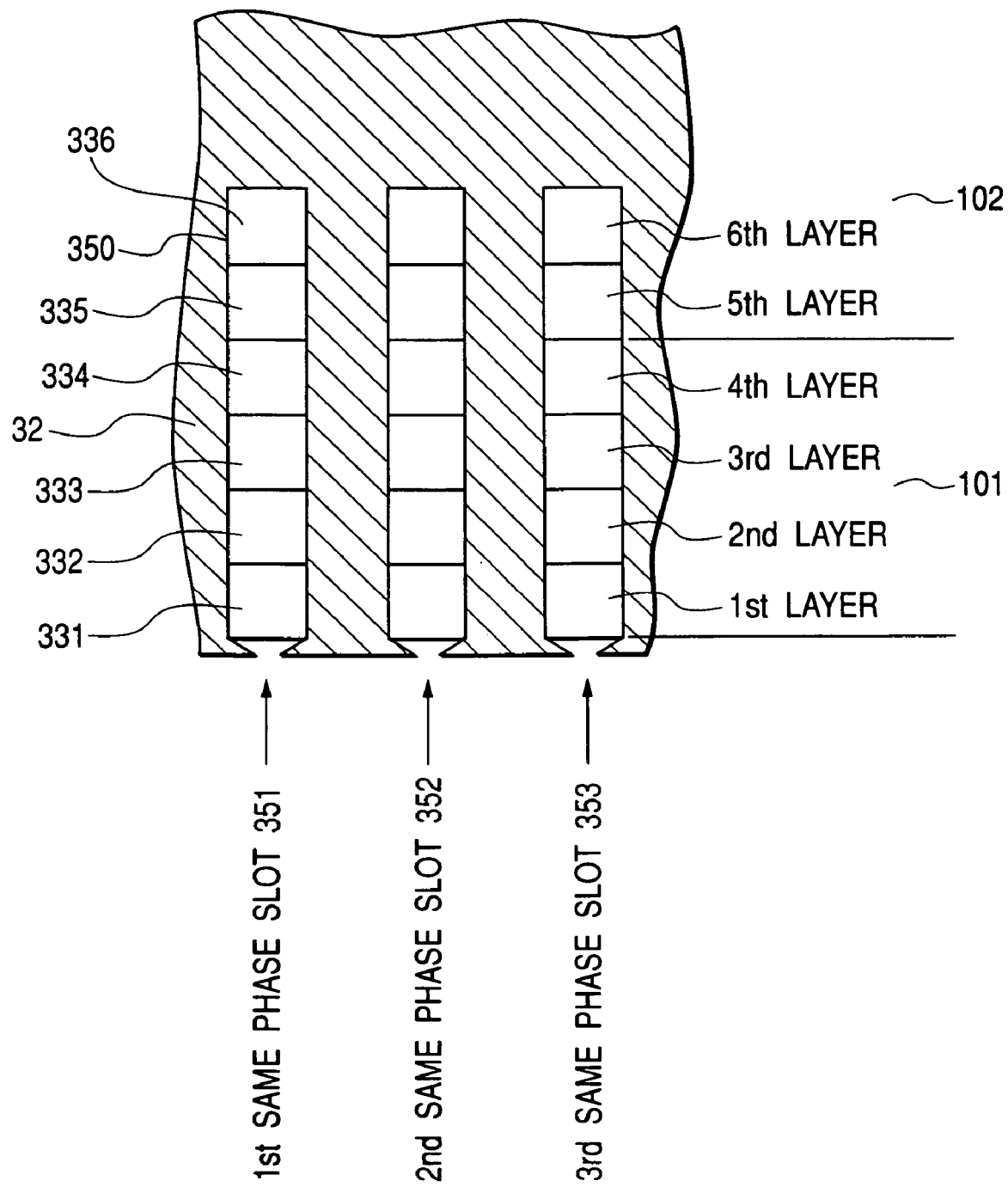
FIG. 13 is a circumferential enlarged sectional view which shows the stator coil of FIG. 12.

FIG. 12 is a sectional view which shows the stator 1 in the axial direction thereof in detail. FIG. 13 is a sectional view which shows the stator 1 in the radius direction thereof in detail.

The stator 1 has formed therein, as described above, three (k=3) same phase slots 351, 352, and 353 for each magnetic pole. A total of p·k·m (p is the number of phases, and m is the number of magnetic poles) slots may be arrayed at equi-angular intervals in the circumferential direction of the core 2. Specifically, the three slots 351 to 353 are arrayed adjacent to each other and have the same phase winding installed therein. In the following discussion, the slots 351, 352, and 353 will also be referred to as a first same phase slot, a second same phase slot, and a third same phase slot, respectively.

The six side conductor portions 331 to 336 of the conductor segments 30 are, as described above, arrayed, as illustrated in FIG. 3, in the radius direction of the core 2.

The conductor segments 30 include four types of segments: the large-sized turn conductor segment 300 having a pair of side conductor portions 33 disposed at the second layer position and the third layer position, respectively, the small-sized turn conductor segment 301 having a pair of side conductor portions 33 disposed at the first layer position and the fourth layer position, respectively, the small-sized turn conductor segment 302 having a pair of side conductor portions 33 disposed at the fifth layer position and the sixth layer position, respectively, and an anomalous turn conductor segment, as will be described later in detail.

The large-sized turn conductor segment 300 and the small-sized turn conductor segment 301 form a portion of the U1-conductor segments connected in series and will be referred to as a lap winding coil 3000, as will be described later in detail. The small-sized turn conductor segment 302 forms another portion of the U1-conductor segments connected in series and will be referred to as a wave winding coil 4000, as will be described later in detail. Numeral 5000 denotes the special U-phase conductor segment which will also be referred to as a radius-direction connecting segment below.

The V-phase coil and the W-phase coil are, as already described, identical in structure with the U-phase coil. No attempt will, thus, be made here to describe the V- and W-phase coils.

Figure 14:
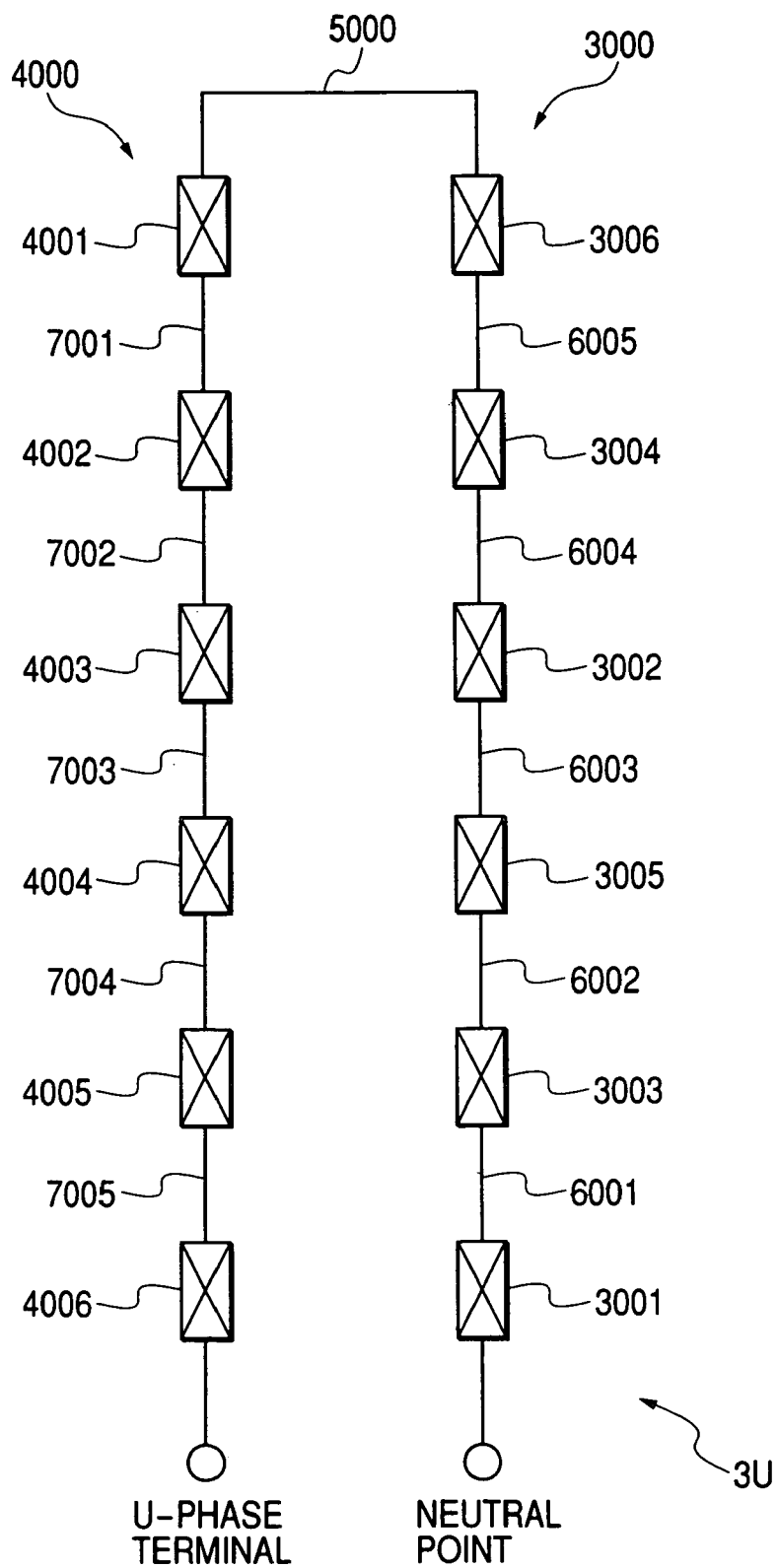
FIG. 14 is a circuit diagram of the stator coil of FIG. 12.

FIG. 14 shows the structure of the U-phase coil, as designated at 3U.

The U-phase coil 3U is made up of the lap winding coil 3000 and the wave winding coil 4000 connected in series through the radius-direction connecting segment 5000. The lap winding coil 3000 connects at an end thereof with a neutral point. The wave winding coil 4000 connects at an end thereof with a U-phase terminal. Alternatively, the lap winding coil 3000 and the wave winding coil 4000 may be joined to the U-phase terminal and the neutral point, respectively.

The lap winding coil 3000 is, as can be seen from the drawing, made up of six series-connected single-turn lap windings 3001 to 3006 connected in series through connecting segments 6001 to 6005. The connecting segment 6003 works as a directional turning segment.

Each of the series-connected single-turn lap windings 3001 to 3006 extends in the same slot position in sets each consisting of three same phase slots 351 to 353 arrayed in the circumferential direction of the core 2. The series-connected single-turn lap windings 3001, 3003, and 3005 extend in one of opposite circumferential directions, while the series-connected single-turn lap windings 3002, 3004, and 3006 extend in the other circumferential direction. The series-connected single-turn lap windings 3001 and 3002 are disposed in each of the same phase slots 351. The series-connected single-turn lap windings 3003 and 3004 are disposed in each of the same phase slots 352. The series-connected single-turn lap windings 3005 and 3006 are disposed in each of the same phase slots 353.

As set of the series-connected single-turn lap windings 3001 and 3002, a set of the single-turn windings 3003 and 3004, and a set of the single-turn windings 3005 and 3006 are different from one another only in the slot location in the circumferential direction of the core 2, that is, they are shifted from each other by one slot pitch in the circumferential direction of the core 2, and identical in spatial arrangement with each other.

Figure 15:
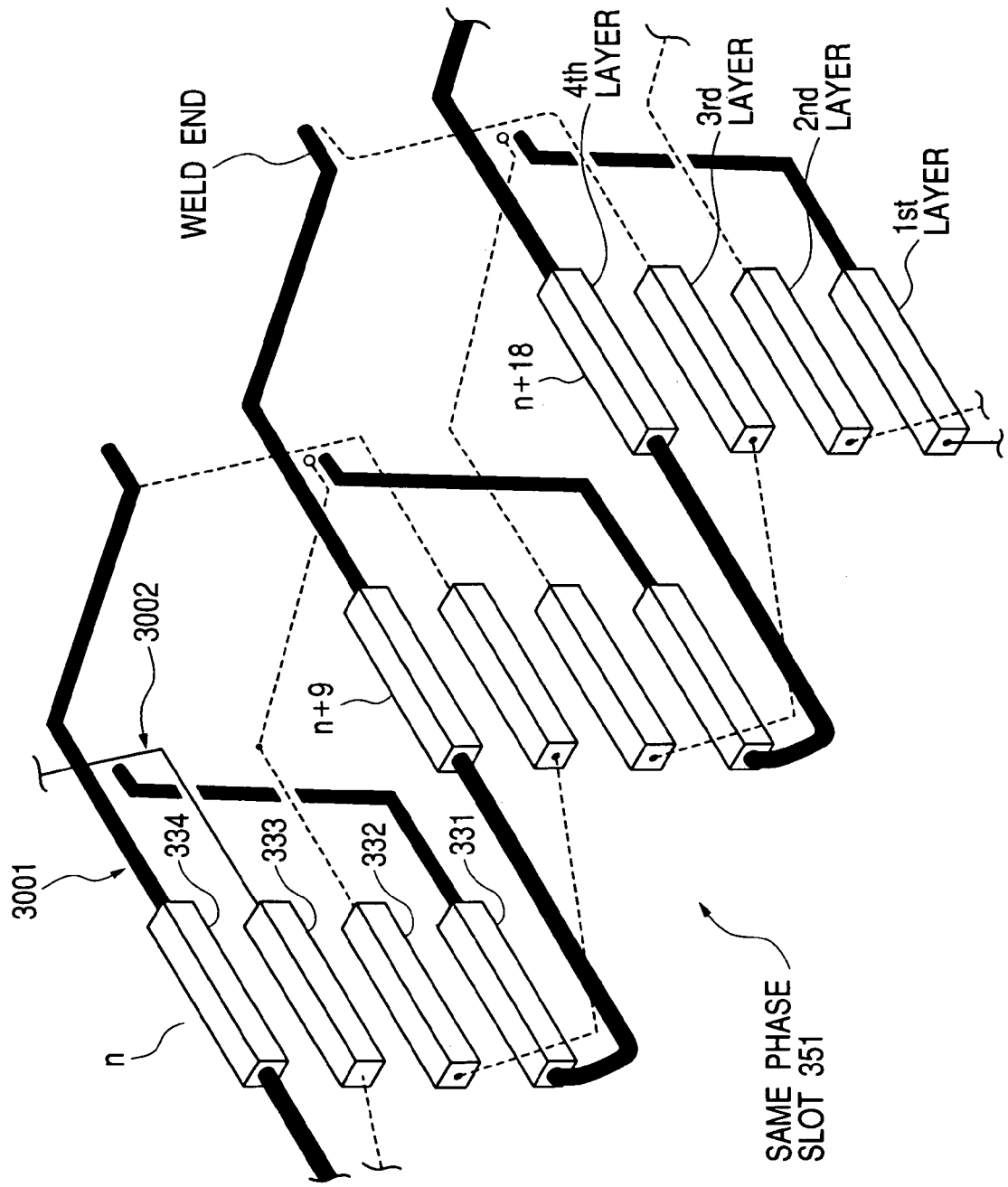
FIG. 15 is a partially perspective view which shows a lap winding coil.

FIG. 15 shows the series-connected single-turn lap windings 3001 and 3002 disposed in the same phase slots 351 whose slot numbers are #n, #n+9, and #n+18.

Each of the series-connected single-turn lap windings 3001 and 3002 is made up of a sequence of single-turn conductor segments, as indicated by a broken line, and wave-turn conductor segments, as indicated by a solid line. The wave-turn conductor segments each have the side conductor portions 331 and 334 disposed at the first and fourth layer positions of the same phase slots 351. The single-turn conductor segments each have the side conductor portions 332 and 333 disposed at the second and third layer positions of the same phase slots 351. The series-connected single-turn lap windings 3001 and 3002 extend in opposite directions.

Figure 16:
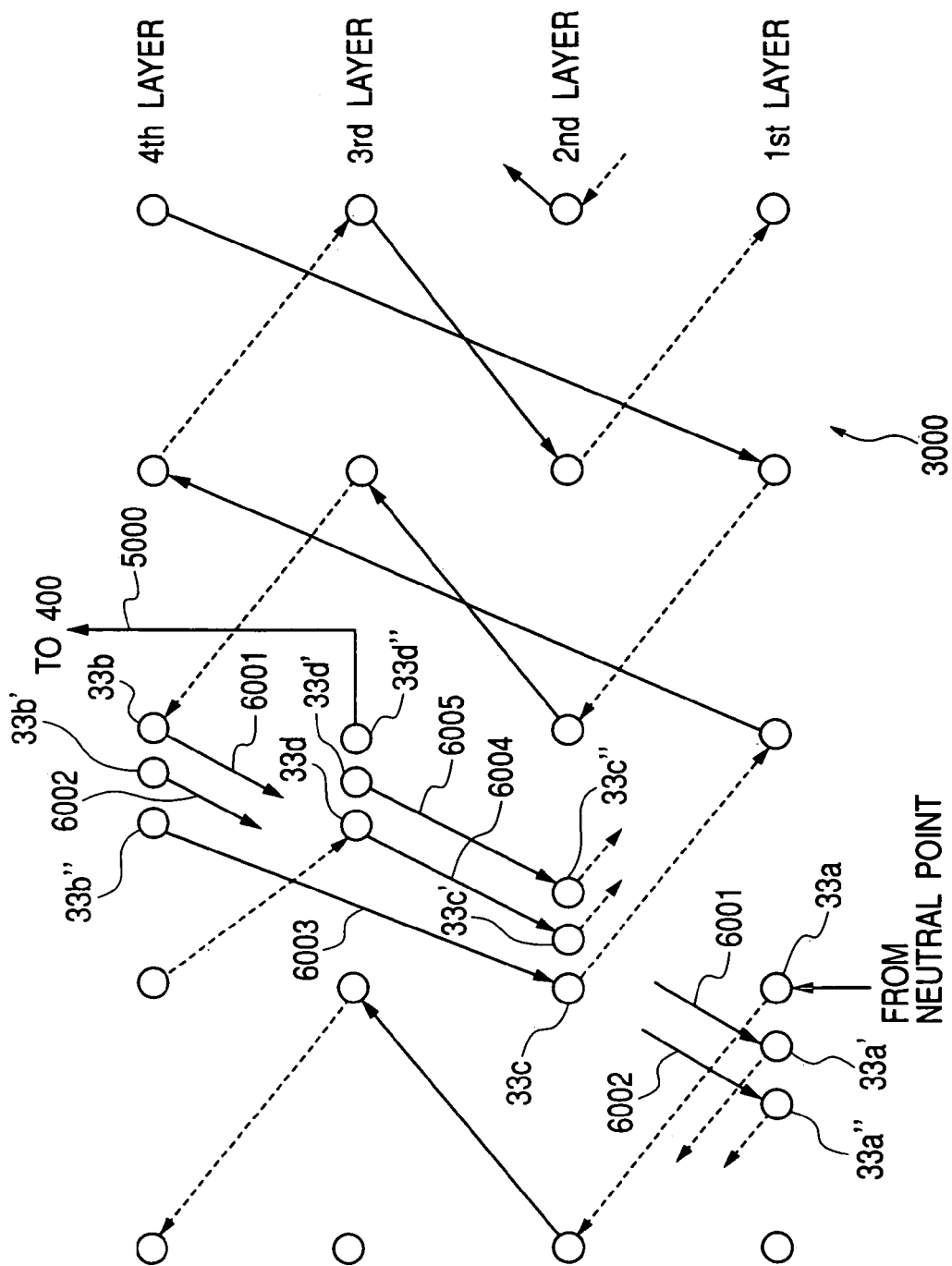
FIG. 16 is a partially wiring diagram of the lap winding coil of FIG. 15 with interconnecting wiring.

The connecting segments 6001 to 6005 of the lap winding coil 3000 will be described below with reference to FIG. 16. A solid line indicates the segment head-side coil end 9, while a broken line indicates the segment end-side coil end 8.

Numeral 33a indicates a first one of the slot-inserted side conductor portions 33 of the conductor segments 30 of the series-connected single-turn lap winding 3001 of the U-phase coil 3U which connects with the neutral point. The side conductor portion 33a is disposed at the fist layer position of one of the same phase slots 351 to 355. Numeral 33a' indicates a first one of the slot-inserted side conductor portions 33 of the conductor segments 30 of the series-connected single-turn lap winding 3003 of the U-phase coil 3U. The side conductor portion 33a' is disposed at the first layer position of one of the same phase slots 351 to 355 next to the one within which the side conductor portion 33a is installed. Numeral 33a" indicates a first one of the slot-inserted side conductor portions 33 of the conductor segments 30 of the series-connected single-turn lap winding 3005 of the U-phase coil 3U. The side conductor portion 33a" is disposed at the fist layer position of one of the same phase slots 351 to 355 next to the one within which the side conductor portion 33a' is installed.

Numeral 33b indicates a final one of the side conductor portions 33 of the conductor segments 30 of the series-connected single-turn lap winding 3001. The side conductor portion 33b is disposed at the fourth layer position of one of the same phase slots 351 to 355. Numeral 33b' indicates a final one of the side conductor portions 33 of the conductor segments 30 of the series-connected single-turn lap winding 3003. The side conductor portion 33b is disposed at the fourth layer position of one of the same phase slots 351 to 355 next to the one within which the side conductor portion 33b is installed. Numeral 33b" indicates a final one of the side conductor portions 33 of the conductor segments 30 of the series-connected single-turn lap winding 3005. The side conductor portion 33b" is disposed at the fourth layer position of one of the same phase slots 351 to 355 next to the one within which the side conductor portion 33b' is installed.

Numeral 33c indicates a fist one of the side conductor portions 33 of the conductor segments 30 of the series-connected single-turn lap winding 3002. The side conductor portion 33c is disposed at the second layer position of one of the same phase slots 351 to 355. Numeral 33c' indicates a first one of the side conductor portions 33 of the conductor segments 30 of the series-connected single-turn lap winding 3004. The side conductor portion 33c' is disposed at the second layer position of one of the same phase slots 351 to 355 next to the one within which the side conductor portion 33c is installed. Numeral 33c" indicates a first one of the side conductor portions 33 of the conductor segments 30 of the series-connected single-turn lap winding 3006. The side conductor portion 33c" is disposed at the second layer position of one of the same phase slots 351 to 355 next to the one within which the side conductor portion 33c' is installed.

Numeral 33d indicates a final one of the side conductor portions 33 of the conductor segments 30 of the series-connected single-turn lap winding 3002. The side conductor portion 33d is disposed at the third layer position of one of the same phase slots 351 to 355. Numeral 33d' indicates a final one of the side conductor portions 33 of the conductor segments 30 of the series-connected single-turn lap winding 3004. The side conductor portion 33d' is disposed at the third layer position of one of the same phase slots 351 to 355 next to the one within which the side conductor portion 33d is installed. Numeral 33d" indicates a final one of the side conductor portions 33 of the conductor segments 30 of the series-connected single-turn lap winding 3006. The side conductor portion 33d" is disposed at the third layer position of one of the same phase slots 351 to 355 next to the one within which the side conductor portion 33d' is installed.

The connecting segments 6001 to 6003 may have the same length as that of the small-sized turn conductor segments 301 in the axial direction of the core 2. The connecting segments 6004 and 6005 may have the same length as that of the large-sized turn conductor segments 300 in the axial direction of the core 2. This minimizes the length of the segment head-side coil end 9 in the axial direction of the core 2. The connecting segment 6003 serves as a directional turning segment. The connecting segments 6001 and 6002 are different in size from the connecting segments 6004 and 6005 so that they may be arrayed without any physical interference with each other. The connecting segment 6003 may have the same length as that of the small-sized turn conductor segment 301 in the axial direction of the core 2.

The wave winding coil 4000 is, as can be seen in FIG. 14, made up of six series-connected wave-shaped single-turn windings 4001 to 4006 connected in series through connecting segments 7001 to 7005. The connecting segment 7003 works as a directional turning line.

Each of the series-connected wave-shaped single-turn windings 4001 to 4006 extends in the same serial slot position in sets each consisting of three same phase slots 351 to 353. The series-connected wave-shaped single-turn windings 4001, 4003, and 4005 extend in one of opposite circumferential directions of the core 2, while the series-connected wave-shaped single-turn windings 4002, 4004, and 4006 extend in the other circumferential direction. The series-connected wave-shaped single-turn windings 4001 and 4002 are disposed each of in the same phase slots 351. The series-connected wave-shaped single-turn windings 4003 and 4004 are disposed in each of the same phase slots 352. The series-connected wave-shaped single-turn windings 4005 and 4006 are disposed in each of the same phase slots 353.

As set of the series-connected wave-shaped single-turn windings 4001 and 4002, a set of the series-connected wave-shaped single-turn windings 4003 and 4004, and a set of the series-connected wave-shaped single-turn windings 4005 and 4006 are different from each other only in the slot location in the circumferential direction of the core 2, that is, they are shifted from one another by one slot pitch in the circumferential direction of the core 2, and identical in spatial arrangement with each other.

Figure 17:
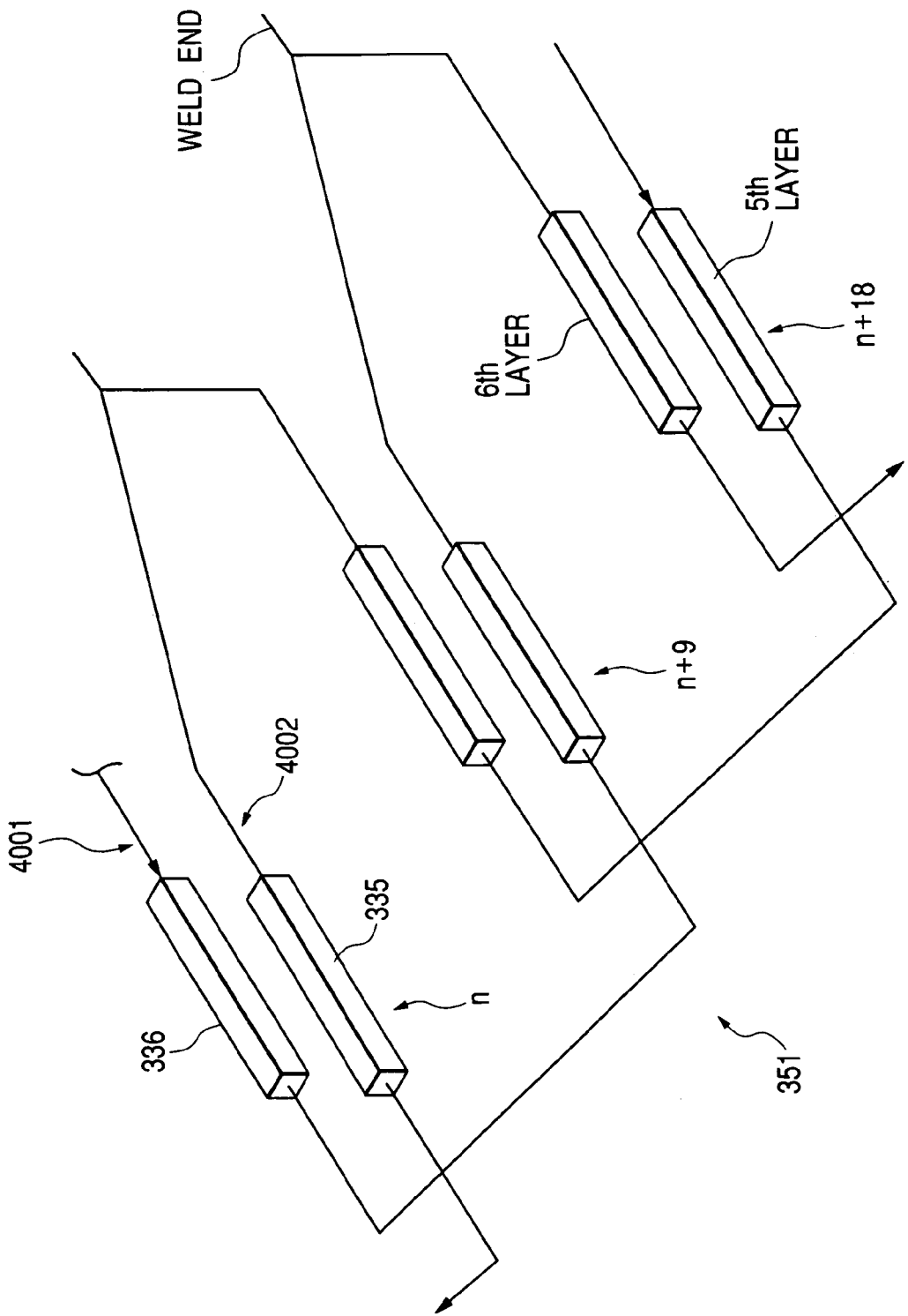
FIG. 17 is a partially perspective view which shows a wave winding coil.

FIG. 17 shows the series-connected wave-shaped single-turn windings 4001 and 4002 disposed in the same phase slots 351 whose slot numbers are #n, #n+9, and #n+18.

Each of the series-connected wave-shaped single-turn windings 4001 and 4002 is made up of a sequence of wave-turn conductor segments. The series-connected wave-shaped single-turn winding 4001 has the side conductor portions 335 and 336 disposed at the fifth layer position of one of the same phase slot 351 and the sixth layer position of the adjacent same phase slot 351. Similarly, the series-connected single/wave-turn winding 4002 has the side conductor portions 335 and 336 disposed at the fifth layer position of one of the same phase slot 351 and the sixth layer position of the adjacent same phase slot 351. The series-connected single/wav-turn windings 4001 and 4002 extend, as indicated by arrows, in opposite directions.

Figure 18:
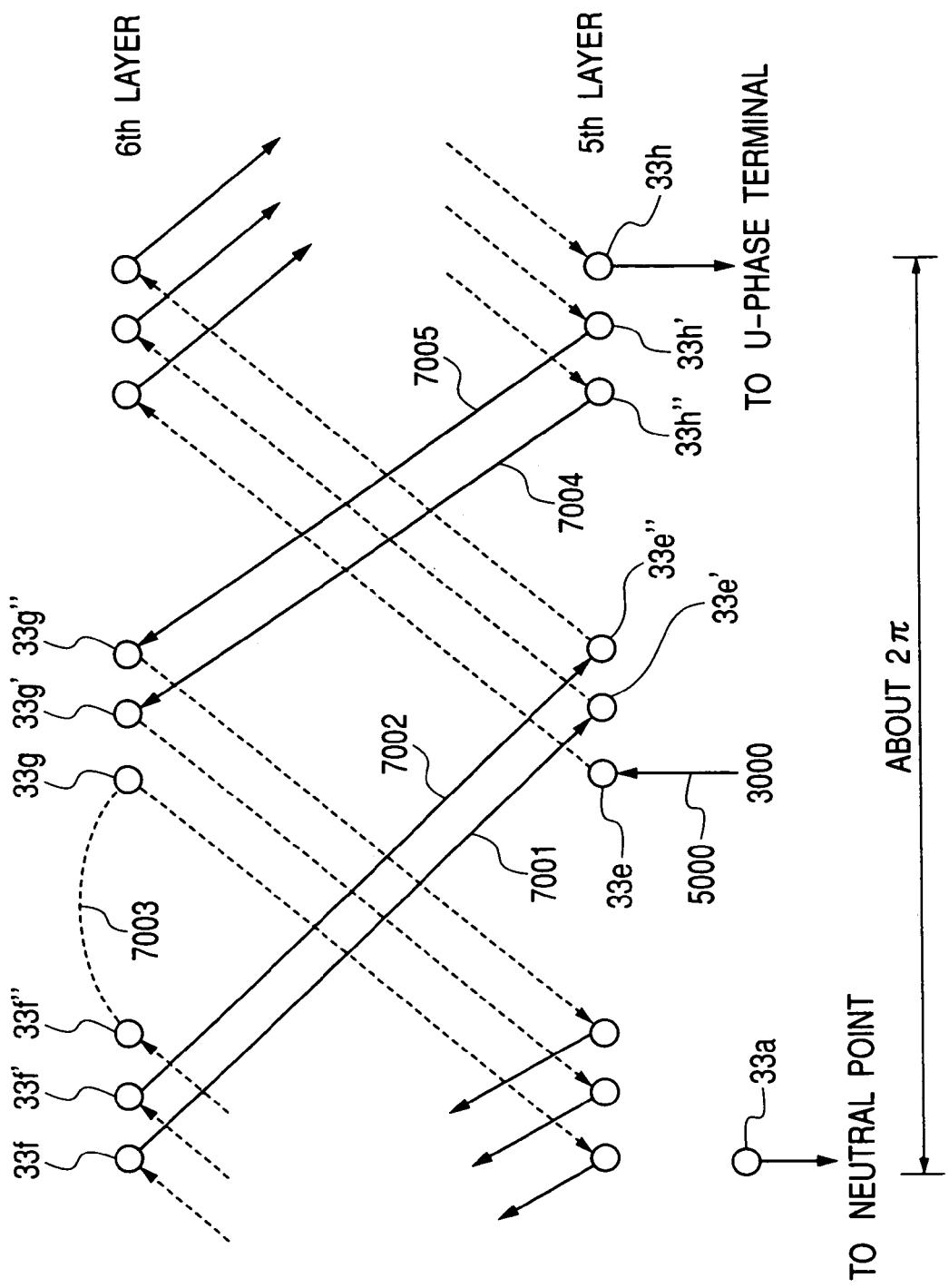
FIG. 18 is a partially wiring diagram of the wave winding coil of FIG. 17 with interconnecting wiring.

The connecting segments 7001 to 7005 of the wave winding coil 4000 will be described below with reference to FIG. 18. A solid line indicates the segment head-side coil end 9, while a broken line indicates the segment end-side coil end 8.

Numeral 33e indicates a first one of the slot-inserted side conductor portions 33 of the conductor segments 30 of the series-connected wave-shaped single-turn winding 4001 leading to the connecting segment 5000 extending from the lap winding coil 3000. The side conductor portion 33e is disposed at the fist layer position of one of the same phase slots 351 to 355. Numeral 33e' indicates a first one of the slot-inserted side conductor portions 33 of the conductor segments 30 of the series-connected wave-shaped single-turn winding 4003. The side conductor portion 33e' is disposed at the fifth layer position of one of the same phase slots 351 to 355 next to the one within which the side conductor portion 33e is installed. Numeral 33e" indicates a first one of the slot-inserted side conductor portions 33 of the conductor segments 30 of the series-connected wave-shaped single-turn winding 4005. The side conductor portion 33e" is disposed at the fifth layer position of one of the same phase slots 351 to 355 next to the one within which the side conductor portion 33e' is installed.

Numeral 33f indicates a final one of the side conductor portions 33 of the conductor segments 30 of the series-connected wave-shaped single-turn winding 4001. The side conductor portion 33f is disposed at the sixth layer position of one of the same phase slots 351 to 355. Numeral 33f' indicates a final one of the side conductor portions 33 of the conductor segments 30 of the series-connected wave-shaped single-turn winding 4003. The side conductor portion 33f' is disposed at the sixth layer position of one of the same phase slots 351 to 355 next to the one within which the side conductor portion 33f is installed. Numeral 33f" indicates a final one of the side conductor portions 33 of the conductor segments 30 of the series-connected wave-shaped single-turn winding 4005. The side conductor portion 33f" is disposed at the sixth layer position of one of the same phase slots 351 to 355 next to the one within which the side conductor portion 33f' is installed.

Numeral 33g indicates a fist one of the side conductor portions 33 of the conductor segments 30 of the series-connected wave-shaped single-turn winding 4002. The side conductor portion 33g is disposed at the sixth layer position of the same one of the same phase slots 351 to 355 as that of the side conductor portion 33e. Numeral 33g' indicates a first one of the side conductor portions 33 of the conductor segments 30 of the series-connected wave-shaped single-turn winding 4004. The side conductor portion 33g' is disposed at the sixth layer position of one of the same phase slots 351 to 355 next to the one within which the side conductor portion 33g is installed. Numeral 33g" indicates a first one of the side conductor portions 33 of the conductor segments 30 of the series-connected wave-shaped single-turn winding 4006. The side conductor portion 33g" is disposed at the sixth layer position of one of the same phase slots 351 to 355 next to the one within which the side conductor portion 33g' is installed.

Numeral 33h" indicates a final one of the side conductor portions 33 of the conductor segments 30 of the series-connected wave-shaped single-turn winding 4002. The side conductor portion 33h" is disposed at the fifth layer position of one of the same phase slots 351 to 355. Numeral 33h' indicates a final one of the side conductor portions 33 of the conductor segments 30 of the series-connected wave-shaped single-turn winding 4004. The side conductor portion 33h' is disposed at the fifth layer position of one of the same phase slots 351 to 355 next to the one within which the side conductor portion 33h" is installed. Numeral 33h indicates a final one of the side conductor portions 33 of the conductor segments 30 of the series-connected wave-shaped single-turn winding 4006. The side conductor portion 33h is disposed at the fifth layer position of one of the same phase slots 351 to 355 next to the one within which the side conductor portion 33h' is installed.

The connecting segments 7001, 7002, 7004, and 7005 may have the same length as that of the small-sized turn conductor segments 302 in the axial direction of the core 2, thereby minimizing the length of the segment head-side coil end 9 in the axial direction of the core 2. The directional turning line 7003 has the side conductor portions 33 disposed at the six layer positions of the slots 700 located at an interval equivalent to one magnetic pole pitch (i.e., electrical angle $\pi$).

Specifically, the side conductor portions 33 leading to the neutral point, the side conductor portions 33 leading to the terminal of the U-phase coil, and the directional turning line 7003 are disposed within an electrical angle of approximately $2\pi$, thus permitting a terminal mount plate to be decreased in width thereof in the circumferential direction of the core 2.

Segment arrangements of the segment head-side coil end 9 and the segment end-side coil end 8 are the same as illustrated in FIGS. 3 to 8, and explanation thereof in detail will be omitted here.

Figure 19:
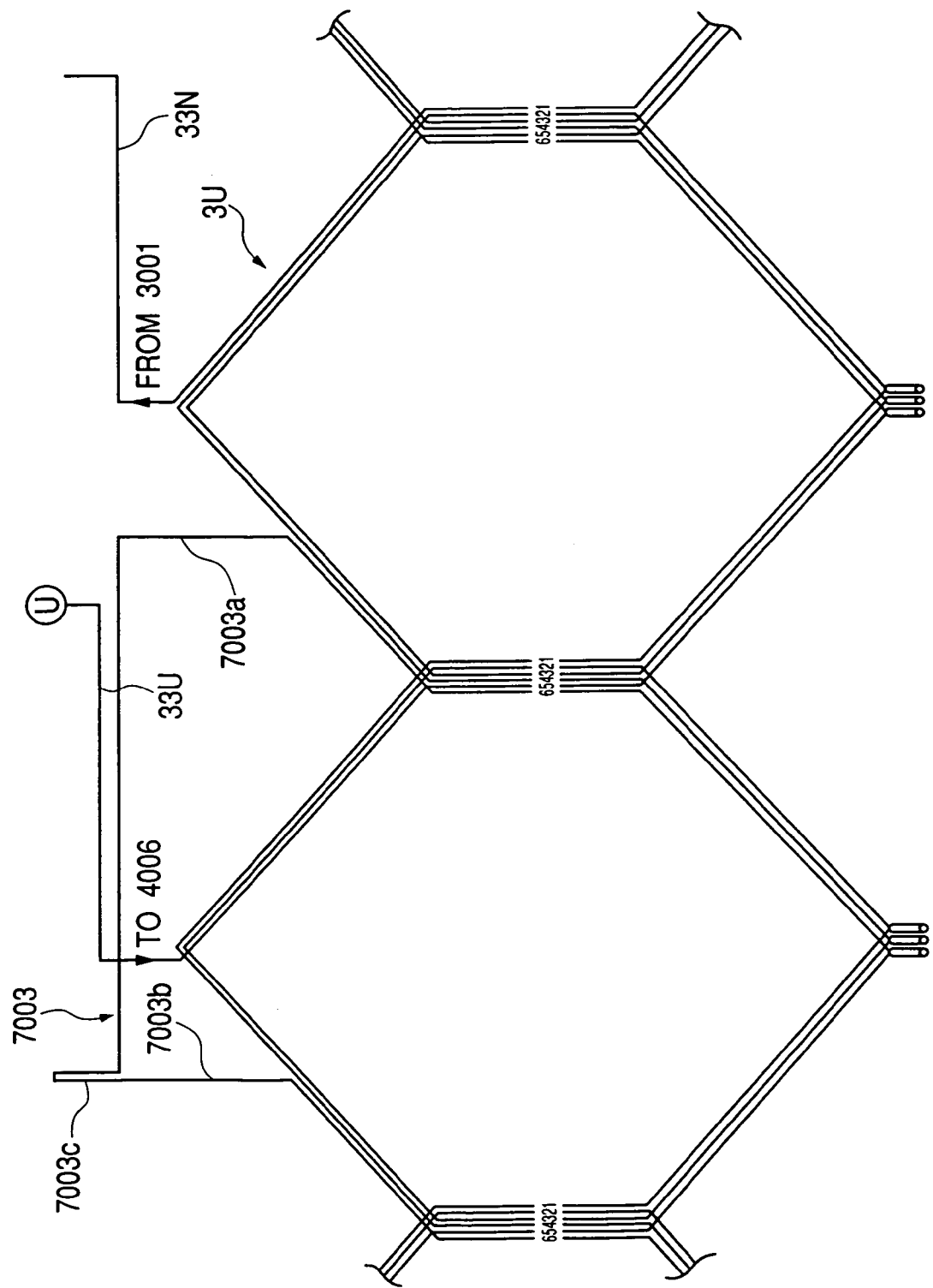
FIG. 19 is a partial development which shows a portion of a U-phase coil with terminal legs.

FIG. 19 shows terminal legs of the U-phase coil 3U.

Numeral 33N denotes a neutral point-connecting terminal leg leading to the series-connected single-turn lap winding 3001 of the U-phase coil 3U. Numeral 33U denotes a terminal leg for connecting with the U-phase terminal. The terminal legs 33N and 33U extend from the two slots 700 spaced from each other through an electrical angle π (i.e., one magnetic pole pitch) and leads to ends of the U-phase coil 3U. The directional turning line 7003 works to connect the series-connected wave-shaped single-turn windings 4003 and 4004 of the wave winding coil 4000 and is made up of first and second portions 7003a and 7003b. The first portion 7003a is formed by an end portion of one of the windings 4003 and 4004 and extends outside the terminal leg 33U in the circumferential direction of the core 2 at the segment head-side coil end 9. The second portion 7003b is formed by an end portion of the other of the windings 4003 and 4004 and is welded at 7003c with the first portion 7003a. This avoids physical interference of the weld 7003c with the terminal legs 33N and 33U and permits the directional turning line 7003 and the terminal legs 33N and 33U to be located within a range of two magnetic pole pitches.

Figure 20:
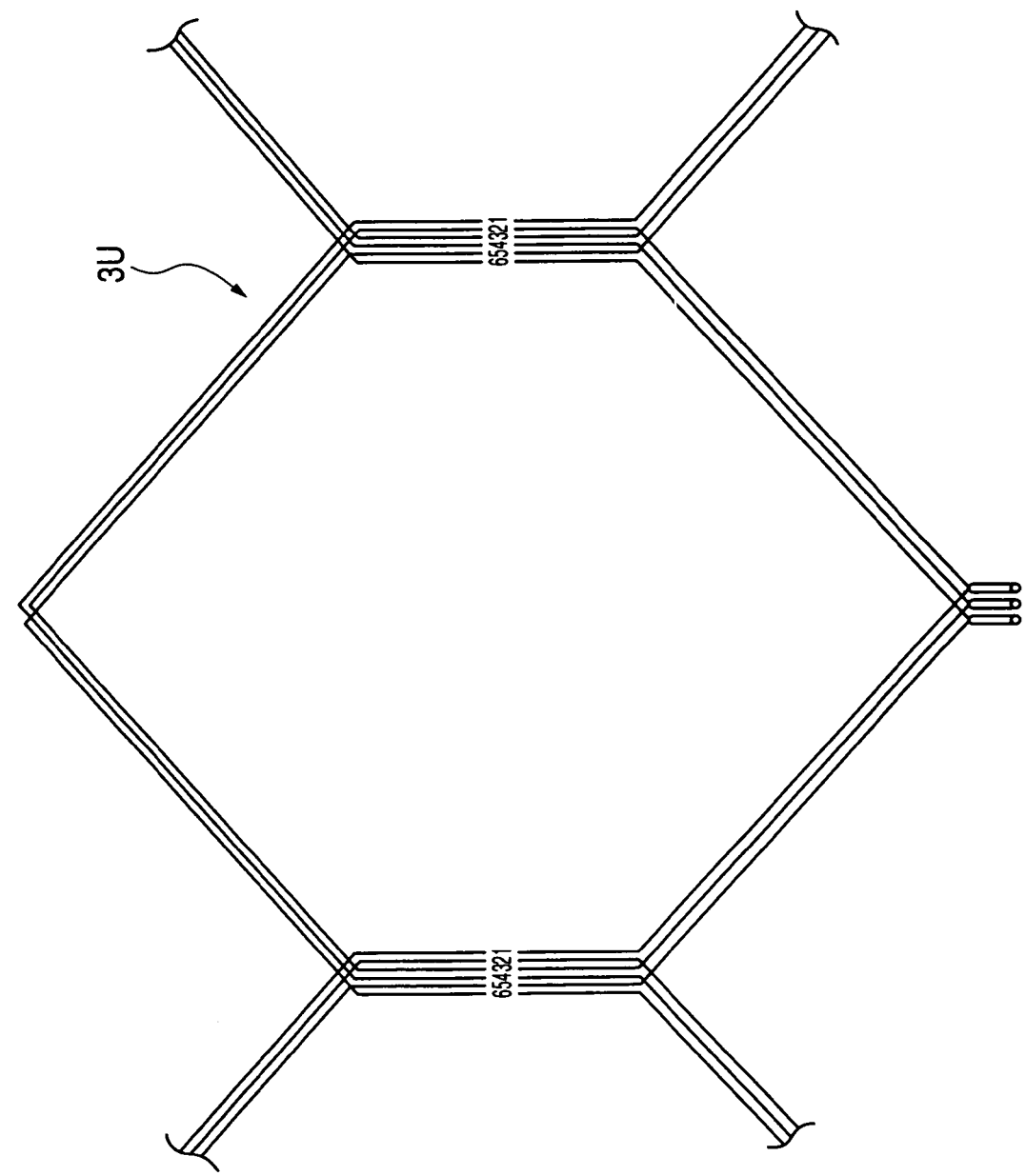
FIG. 20 is a partial development which shows a portion of a U-phase coil with no terminal legs.

The directional turning lines 7003 and terminal legs of the U-phase, V-phase, and W-phase coils are preferably shifted by required slot pitches in the circumferential direction of the core 2 in order to avoid physical interference therebetween, but it is advisable that they be located close to each other in order to avoid undesirable increases in length of the neutral point connecting terminal legs 33N and in width of the terminal mount plate. One of the terminal legs 33U may be replaced with the neutral point connecting terminal leg 33N. The wave winding coil 4000 may alternatively be disposed at the first and second layer position of the slots 700. The lap winding coil 3000 may alternatively be disposed at the third to sixth layer of the slots 700. FIG. 20 shows a portion of the U-phase coil 3U where there are no terminal legs.

One or more coils identical with lap winding coil 3000 may also be arrayed in the circumferential direction of the core 2 in series connection with the U-phase coil 3U using the connecting segment 5000.

Third Embodiment

Figure 21:
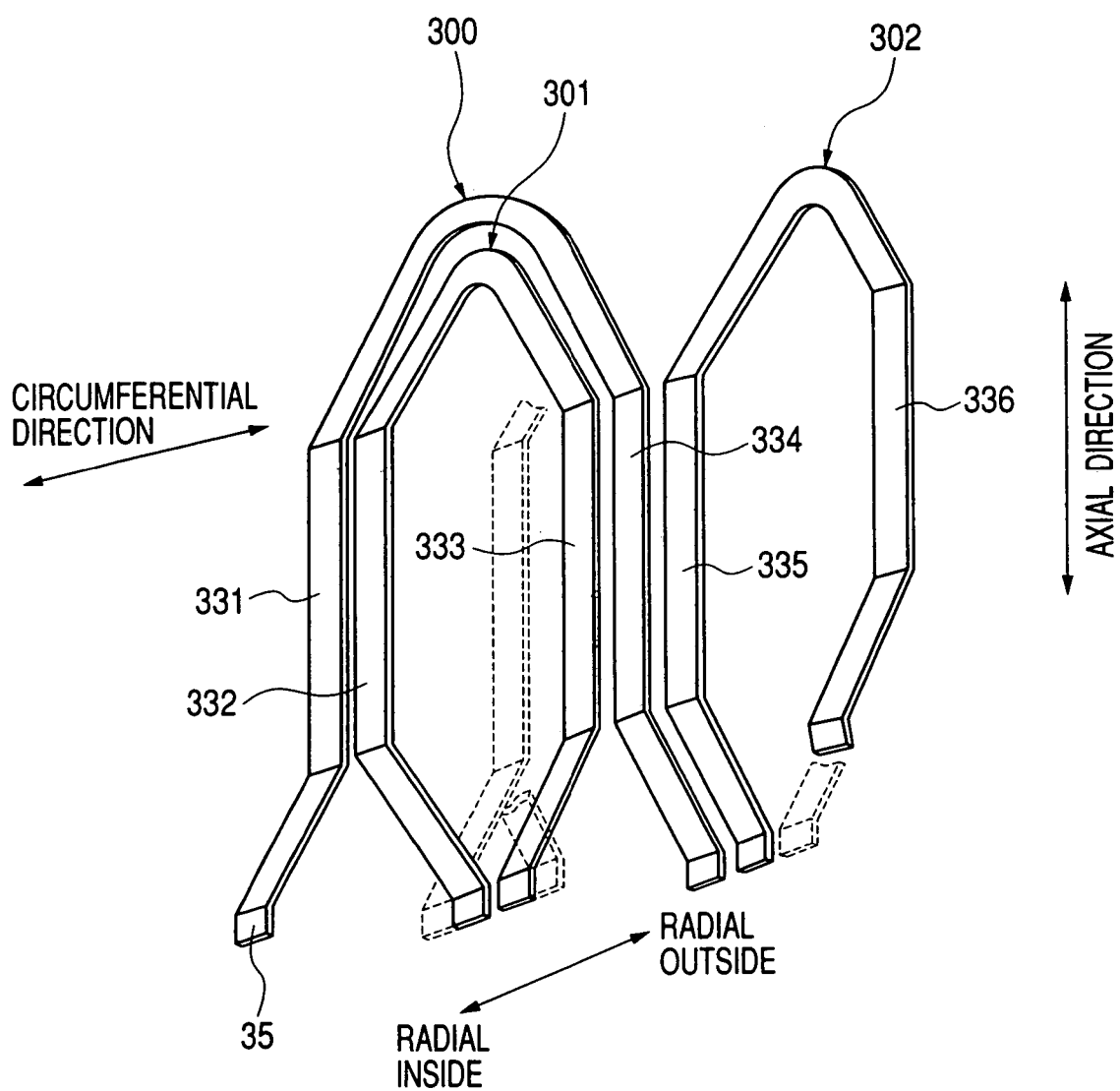
FIG. 21 is a partial perspective view which shows conductor segments of a stator coil according to the third embodiment of the invention.

FIG. 21 shows the conductor segment 30 which includes three types of segments: the large-sized turn conductor segment 300, the small-sized turn conductor segment 301, and the small-sized turn conductor segment 302. The large-sized turn conductor 300 has the side conductor portion 331 disposed at the first layer position and the side conductor portion 334 disposed at the fourth layer position. The small-sized turn conductor segment 301 has the side conductor portion 332 disposed at the second layer position and the side conductor portion 333 disposed at the third layer position. The large-size turn conductor segment 300 and the small-sized turn conductor segment 301 form a circumferentially joined four-conductor leg coil, as will also be referred to as a first coil below. The small-sized turn conductor segment 302 has the side conductor portion 335 disposed at the fifth layer position and the side conductor portion 336 disposed at the sixth layer position and forms a circumferentially joined two-conductor leg coil, as will also be referred to as a second coil below.

Specifically, the side conductor portions 331 and 334 of each of the conductor segments 300 are inserted into two of the slots 700 spaced from each other at a magnetic pole pitch, respectively. Similarly, the side conductor portions 332 and 333 of each of the conductor segments 301 are inserted into two of the slots 700 spaced from each other at a magnetic pole pitch, respectively. Similarly, the side conductor portions 335 and 336 of each of the conductor segments 302 are inserted into two of the slots 700 spaced from each other at a magnetic pole pitch, respectively.

Figure 22:
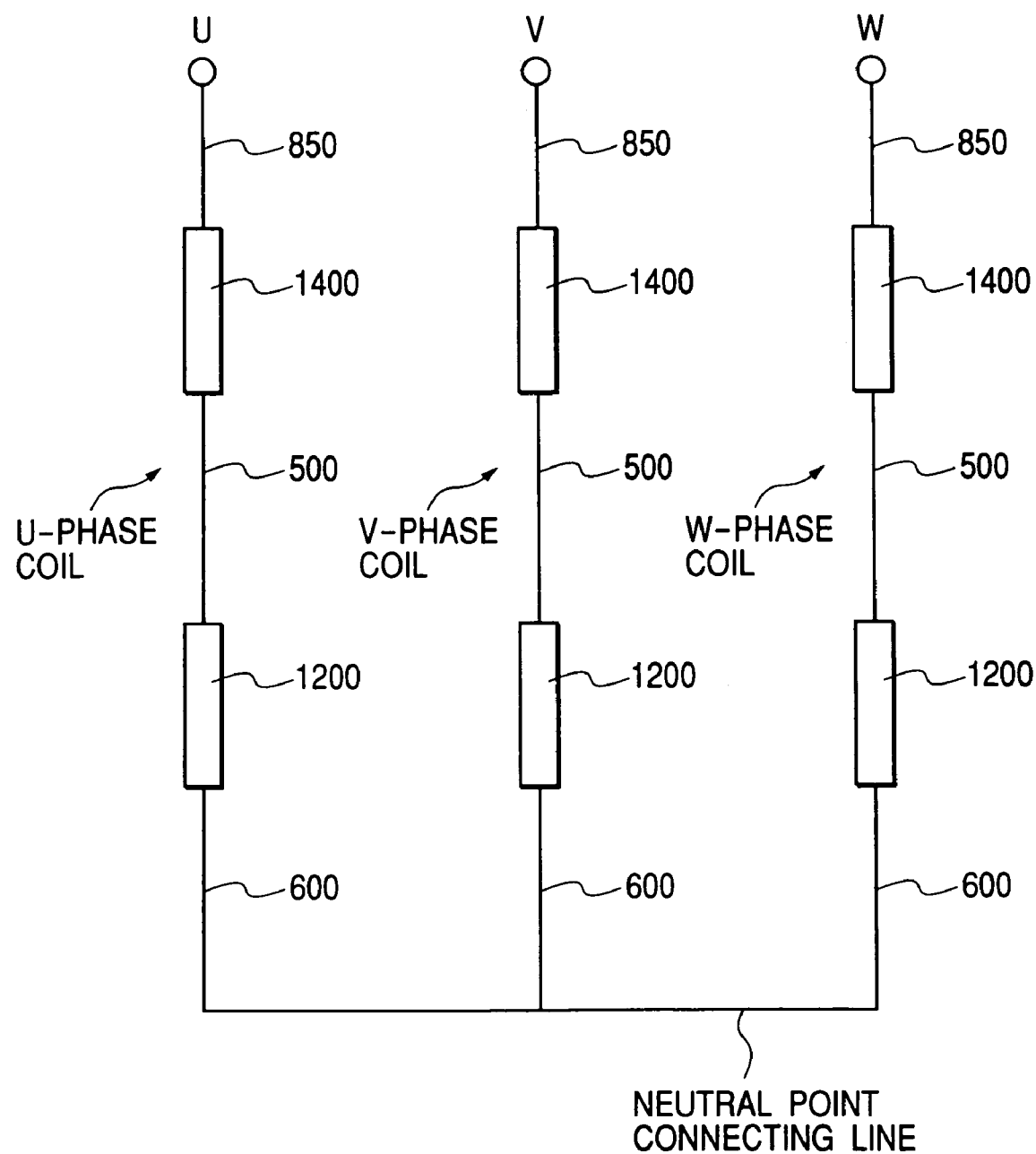
FIG. 22 is a circuit diagram which shows a three-phase star-connected winding equipped with six coils which forms a stator coil in the third embodiment of the invention.
Figure 23:
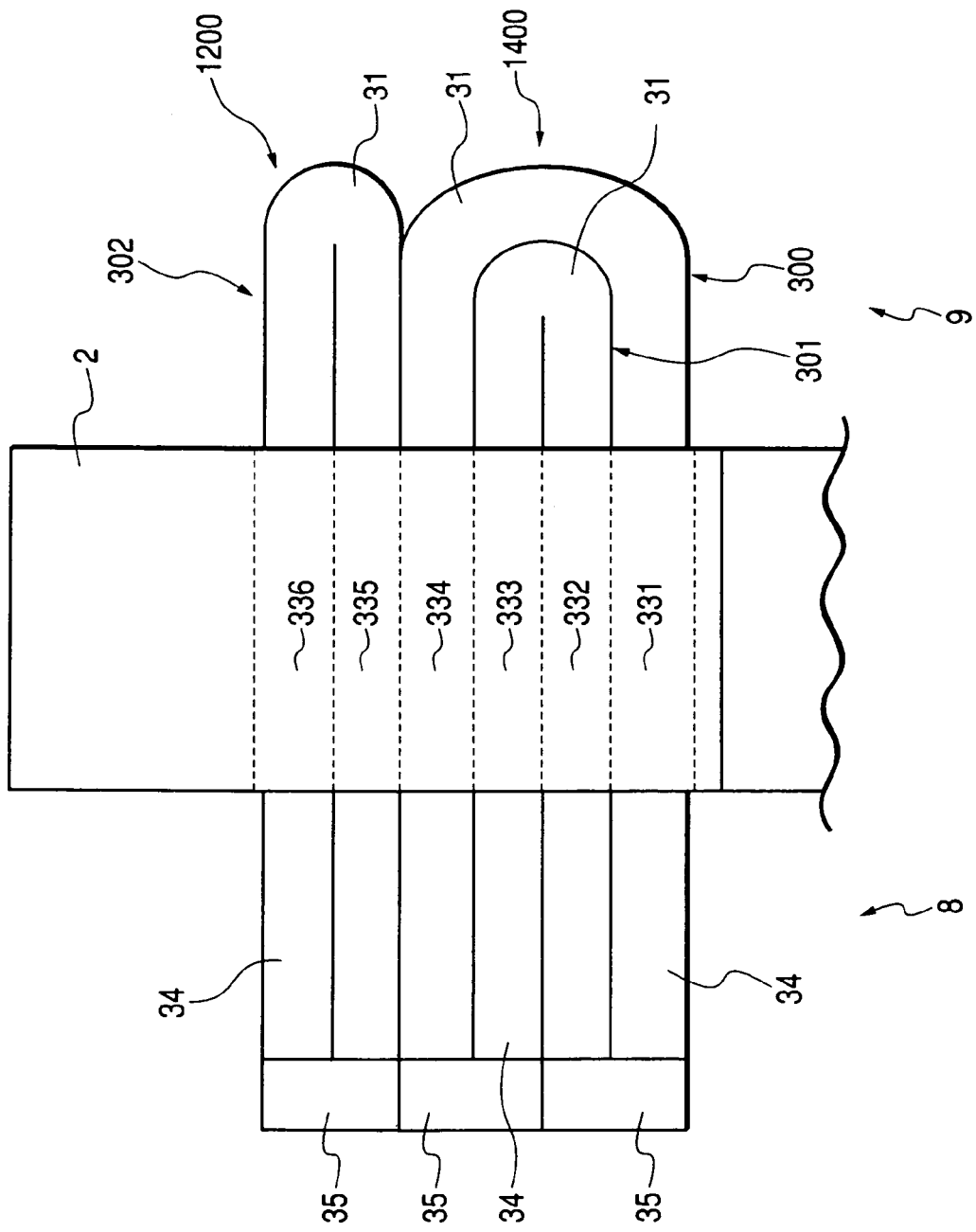
FIG. 23 is a partial sectional view of a stator coil of the third embodiment as taken in an axial direction of a core.

FIG. 22 shows an equivalent circuit of the stator coil 3. Each of the U-phase, V-phase, and W-phase coils is made up of the radially arrayed four-conductor leg coil 400 consisting of a sequence of the large-size turn conductor segments 300 and the small-sized turn conductor segments 301 connected alternately, the radially arrayed two-conductor leg coil 1200 consisting of a sequence of the small-sized turn conductor segments 302, and the U-shaped joint conductor segment 500 connecting the coils 1400 and 1200. The joint conductor segment 500 has two side conductor portions: one being a final one of the side conductor portions of the coil 1400 and the other being a first one of the side conductor portions of the coil 1200. A final one of the side conductor portions of the coil 1200 leads to the L-shaped conductor segment 600 which forms a portion of the neutral point connecting terminal leg. A first one of the coil 1400 leads to the L-shaped conductor segment 850 which also serves as a terminal leg. The radially arrayed two-conductor leg coil 1200 and the radially arrayed four-conductor leg coil 1400 are shown in FIG. 23 in detail.

A desired arrangement or pattern in which the radially arrayed two-conductor leg coil 1200 and the radially arrayed four-conductor leg coil 1400 are inserted into the slots 700 depends upon the number of the slots 700 for each magnetic pole and phase and a winding type such as full-pitch winding or fractional pitch winding and is well known in the art. Explanation thereof in detail will be omitted here.

A production method of the radially arrayed two-conductor leg coil 1200 and the radially arrayed four-conductor leg coil 1400 will be described blow.

1 Head Twisting Process (Head Spreading Process)

Figure 24:
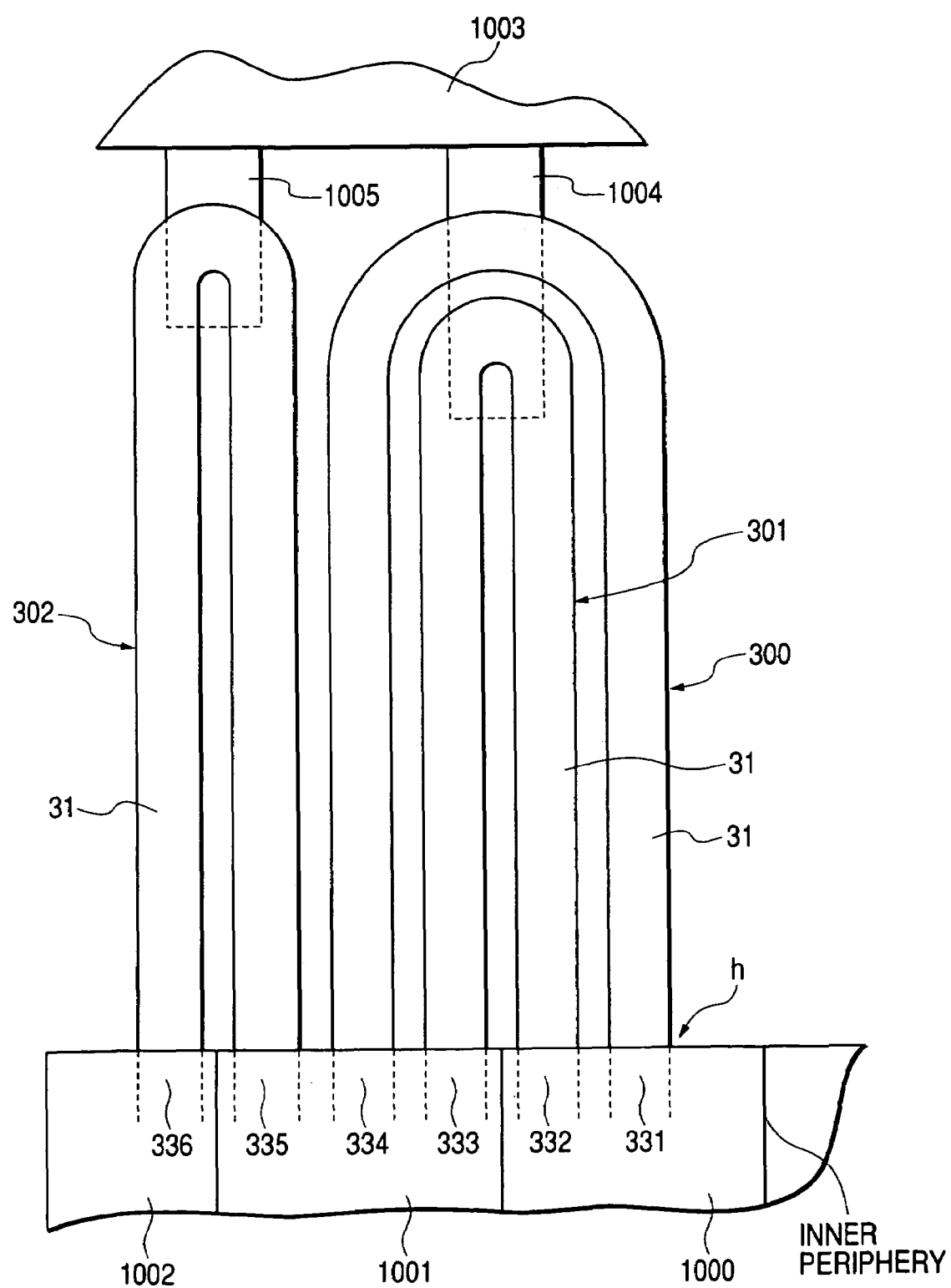
FIG. 24 is a partial view which shows a segment head-spreading step of a production process of a stator coil of the third embodiment of the invention.
Figure 25:
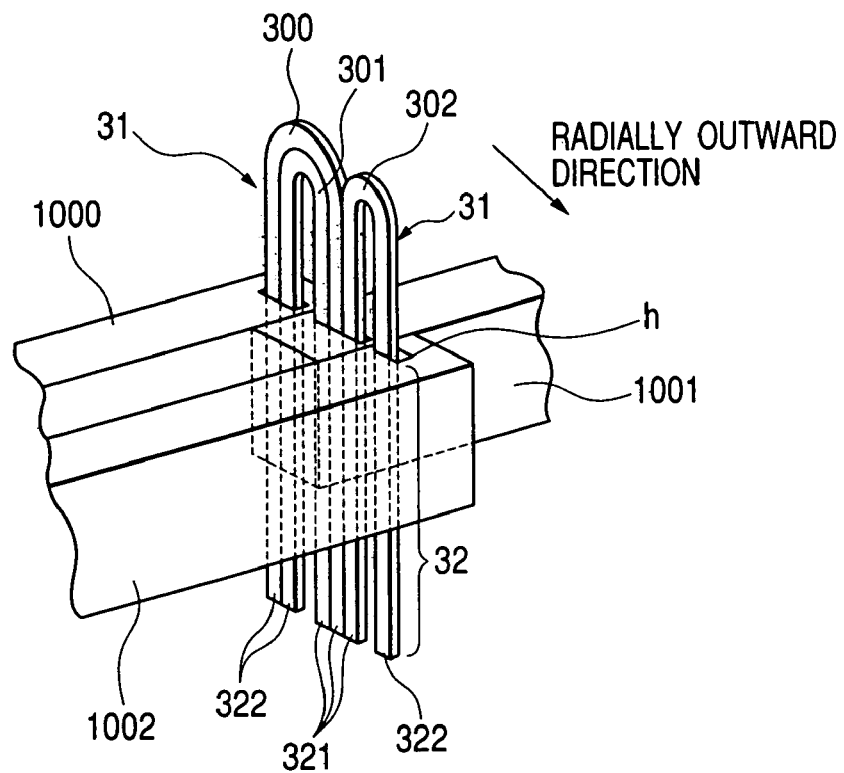
FIG. 25 is a partial perspective view which shows a segment head-spreading step before heads of conductor segments are spread.

The head twisting process will be described below with reference to FIGS. 24 to 26. FIGS. 24 and 25 show the three types of conductor segments 300 to 302 before the heads thereof are twisted in the circumferential direction of the core 2, that is, they are spread, so that the first and second legs 321 and 322 of the conductor segments 300 to 302 extend straight from ends of the head 31, respectively.

The rings 1000 to 1002 are arrayed coaxially with each other so that they may be turned relative to each other. The ring 1000 has the smallest diameter, while the ring 1002 has the greatest diameter. The rings 1000 to 1002 each have as many grooves or holes h, as illustrated in FIG. 25, as the slots 700 of the core 2 formed therein at regular intervals identical with pitches of the slots 700.

In the production process, the legs 32 of the conductor segments 300 to 302 are inserted into the holes h of the rings 1000 to 1002 with the heads 31 projecting outside the rings 1000 to 1002.

Specifically, in the first step, as illustrated in FIG. 24, the side conductor portion 331 of the conductor segment 300 and the side conductor portion 332 of the conductor segment 301 are inserted into the holes h of the ring 1000. The side conductor portion 333 of the conductor segment 301, the side conductor portion 334 of the conductor segment 300, and the side conductor portion 335 of the conductor segment 302 are inserted into the holes h of the ring 1001. The side conductor portion 336 of the conductor segment 302 is inserted into the hole h of the ring 1002.

The press ring 1003 is placed above the conductor segments 300 to 302 which has a pair of tines 1004 (only a back side one is shown for the brevity of illustration). The tines 1004 extend vertically to nip the tops of the heads 31 of the conductor segments 300 and 301. Similarly, a pair of tines 1005 (only a back side one is shown for the brevity of illustration) extends from the press ring 1003 and nips the top of the head 31 of the conductor segment 302.

Next, the rings 1000 and 1002 are turned, for example, in a clockwise direction, while the ring 1001 is turned in a counterclockwise direction with the press ring kept stationary. In this embodiment, the angle through which the rings 1000 and 1002 rotate is set to half a magnetic pole pitch, but the sum of rotational angle of the rings 1000 and 1002 and rotational angle of the ring 1001 (i.e., a difference between absolute values of the rotational angles) may be equal to the magnetic pole pitch (i.e., an electrical angle π).

Figure 26:
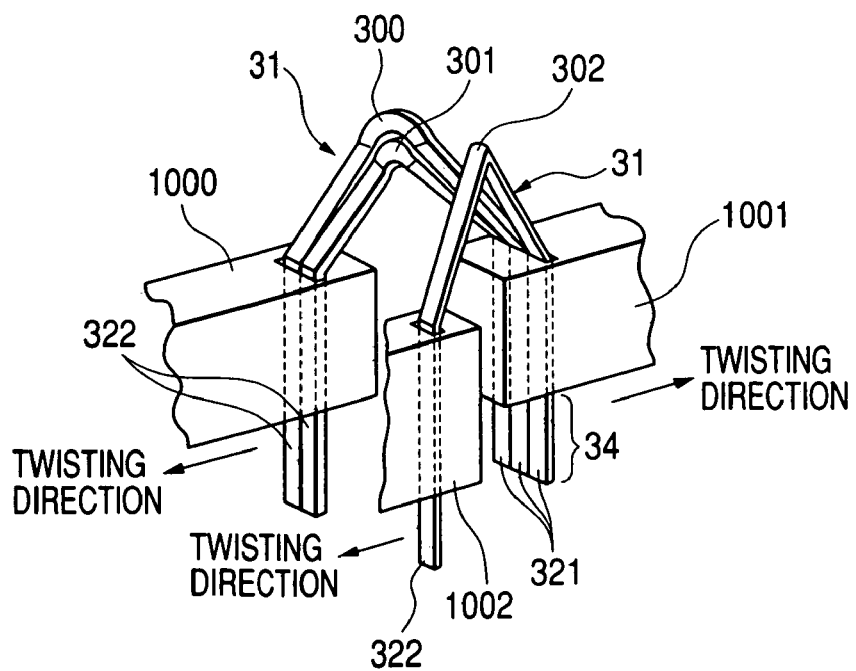
FIG. 26 is a partial perspective view which shows a segment head-spreading step while heads of conductor segments are being spread.

The above rotation of the rings 1000 to 1002 causes the ends of heads 31 of the conductor segments 300 to 302 to be spread, as clearly shown in FIG. 26, in the circumferential direction of the rings 1000 to 1002 and the first and second legs 321 and 322 of each of the conductor segments 300 to 302 to be spaced from each other at the magnetic pole pitch.

During the above head spreading, the height of the heads 31 of the conductor segments 300 to 302 from the surfaces of the rings 1000 to 1002 decreases. The press ring 1003 is, thus, moved downward to the rings 1000 to 1002 as a function of such a decrease in height of the heads 31. After completion of the spreading of the heads 31, the rings 1000 to 1002 are removed from the conductor segments 300 to 302 while holding the conductor segments 300 to 302 through the press ring 1003.

In the head spreading step, rotational angles of the rings 1000 and 1001 themselves may be set to any value as long as the sum of the rotational angles reaches one magnetic pole pitch. As an alternative to the above rotation of the rings 1000 to 1002, the rings 1000 and 1002 may be kept stationary, while the ring 1000 may be turned at the magnetic pole pitch and the press ring 1003 is turned at one-half of the magnetic pole pitch in the same direction as that of the ring 1000. Alternatively, the ring 1001 may be kept stationary, while the rings 1000 and 1002 may be turned at the magnetic pole pitch, and the press ring 1003 may be turned at one-half of the magnetic pole pitch in the same direction as that of the rings 1000 and 1002.

As apparent from the above discussion, the head spreading process is accomplished by holding the first leg 321 of the conductor segment 302 of the radially arrayed two-conductor leg coil 200 and the first leg 321 of the conductor segment 300 of the radially arrayed four-conductor leg coil 400 which is located adjacent the first leg 321 of the conductor segment 302 in the radius direction within the ring 1001, holding the second leg 322 of the conductor segment 302 within the ring 1002 placed outside the ring 1001, holding the second leg 322 of the conductor segment 300 within the ring 1000 placed inside the ring 1001, and rotating the rings 1000 to 1002 in the above manner. Specifically, the spreading of the heads 31 of the conductor segments 300 to 302 is achieved while holding the legs of the conductor segments 300 and 302 which belong to the different coils and extend adjacent to each other in the radius direction of the rings 1000 to 1002 in the same ring, thereby deforming the conductor segments 300 to 302 to desired shapes without any friction between the heads 31 of the conductor segments 300 and 302.

2 Insertion of Conductor Segment to Slot

After completion of the spreading of the heads 31 of the conductor segments 300 to 302, they are inserted into the slots 700 of the core 2 while keeping spatially arrangements and orientation thereof as they are. Afterwards, the press ring 1003 is removed.

3 End Stwisting Process (End Spreading Process)

The ends 34 of the conductor segments 300 to 302 inserted through the slots 700 of the core 2 are twisted or spread in the following manner.

Figure 27:
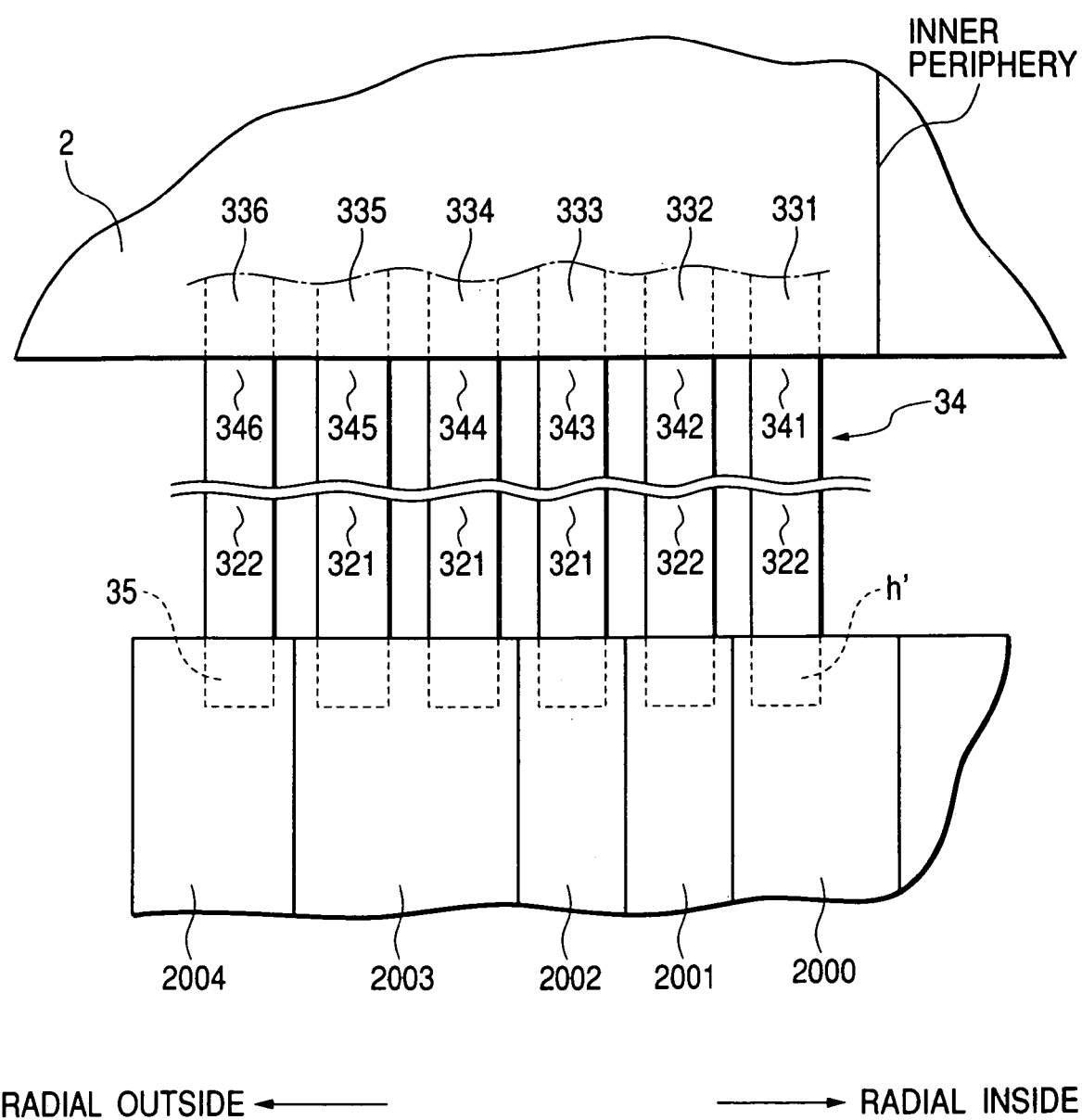
FIG. 27 is a partial view which shows a segment end-spreading step of a production process of a stator coil of the third embodiment of the invention.

The rings 2000 to 2004 are, as shown in FIG. 27, placed coaxially so that they may rotate relative to each other. The rings 2000 to 2004 each have as many grooves or holes h' as the slots 700 of the core 2 formed in an end surface thereof at regular intervals identical with pitches of the slots 700.

First, the tips 35 of the end portions 34 of the conductor segments 300 to 302 are inserted into the holes h' of the rings 2000 to 2004. Numerals 341, 342, 343, 344, 345, and 346 denote ends of the second leg 322 of the conductor segment 300, the second leg 322 of the conductor segment 301, the first leg 321 of the conductor segment 301, the first leg 321 of the conductor segment 300, the first leg 321 of the conductor segment 302, the second leg 322 of the conductor segment 302, respectively.

The tip 35 of the end portion 341 is fitted within the ring 2000. The tip 35 of the end portion 342 is fitted within the ring 2001. The tip 35 of the end portion 343 is fitted within the ring 2002. The tips 35 of the end portions 344 and 345 are fitted within the ring 2003. The tip 35 of the end portion 346 is fitted within the ring 2004.

Next, the rings 2000, 2002, and 2004 located at odd positions as counted from the inside of the stator core 2 are turned, for example, in a clockwise direction through one-half of the magnetic pole pitch, while the rings 2001 and 2003 located at even positions are turned in a counterclockwise direction through one-half of the magnetic pole pitch, thereby spreading the legs 341 to 346 in the circumferential direction of the core 2. The tip 35 of the leg 341 is spaced from the tip 35 of the leg 342 at the magnetic pole pitch. The tip 35 of the leg 343 is spaced from the tip 35 of the leg 344 at the magnetic pole pitch. The tip 35 of the leg 345 is spaced from the tip 35 of the leg 346 at the magnetic pole pitch. After completion of the spreading of the end portions 34, the rings 2000 to 2004 are drawn from the end portions 341 to 346.

The end spreading will cause the height of the end portions 341 to 346, that is, the distance between the stator core 2 and the rings 2000 to 2004 to be decreased. It is, thus, advisable that the core 2 be moved downward or alternatively the rings 2000 to 2004 be moved upward simultaneously with the rotation of the rings 2000 to 2004.

In the above end spreading step, rotational angles of the rings 2000 to 2004 themselves may be set to any values as long as the sum of the rotational angle of the rings 2000, 2002, and 2004 arrayed in the odd positions and the rotational angle of the rings 2001 and 2003 arrayed in the even positions reaches one magnetic pole pitch. As an alternative to the above rotation of the rings 2000 to 2004, one of a set of the rotational angle of the rings 2000, 2002, and 2004 arrayed in the odd positions and a set of the rotational angle of the rings 2001 and 2003 arrayed in the even positions reaches may be turned through one magnetic pole pitch, and at the same time, the core 2 may be turned through a given angle while keeping the other set stationary.

As apparent from the above discussion, the end spreading process is accomplished by holding in the ring 2003 the first leg 321 (i.e., the end portion 345) of the conductor segment 302 of the radially arrayed two-conductor leg coil 1200 and the first leg 321 (i.e., the end portion 345) of the conductor segment 300 of the radially arrayed four-conductor leg coil 1400 which is located adjacent the first leg 321 of the conductor segment 302 in the radius direction of the core 2, thus avoiding undesirable friction between the end portions 344 and 345 during the spreading thereof.

4 Joining Process

After the end portions 341 to 346 are spread in the above manner, the tips 35 of the end portions 341 and 342 arrayed adjacent to each other in the radius direction of the core 2 are welded together. The tips 35 of the end portions 343 and 344 arrayed adjacent to each other in the radius direction of the core 2 are welded together. Similarly, the tips 35 of the end portions 345 and 346 arrayed adjacent to each other in the radius direction of the core 2 are welded together. The welding may be implemented by TIG welding, brazing, resistance welding, electron beam welding, or laser welding.

The anomalous conductor segments 500, 600, and 850, as illustrated in FIG. 22, may be made in the above described head and end spreading processes or alternatively be preformed and inserted into the slots 700 of the core 2. In a case where within the radially arrayed two-conductor leg coils 1200 and the radially arrayed four-conductor leg coils 1400, the two or more same phase slots 700 are arrayed adjacent to each other for each magnetic pole and phase, the conductor segments 30 fitted in the same phase slots 700 located adjacent to each other may be joined in the same manner as that described in the first embodiment.

Figure 28:
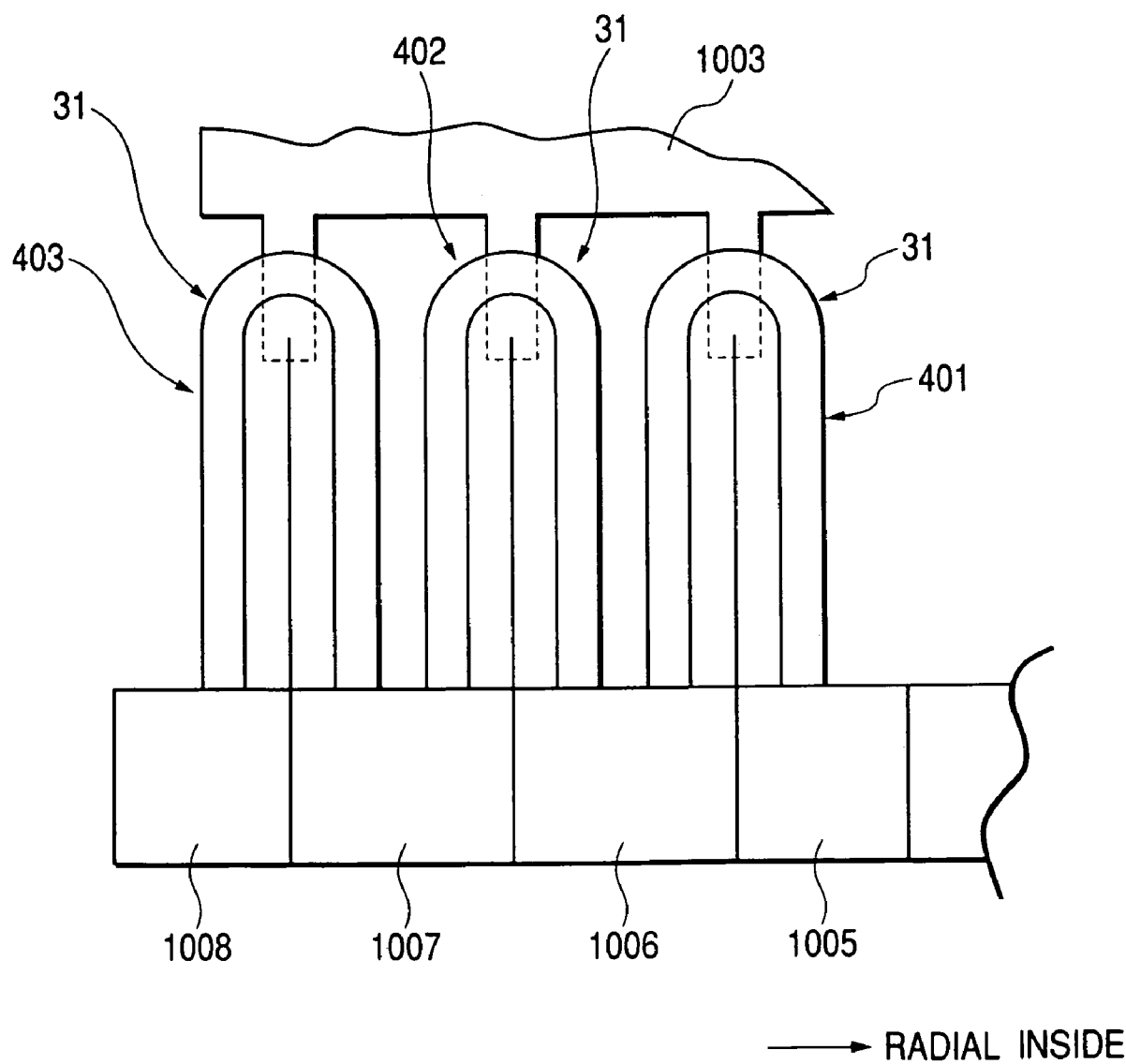
FIG. 28 is partial view which shows a modification of the segment head-spreading step, as illustrated in FIGS. 25 and 26.
Figure 29:
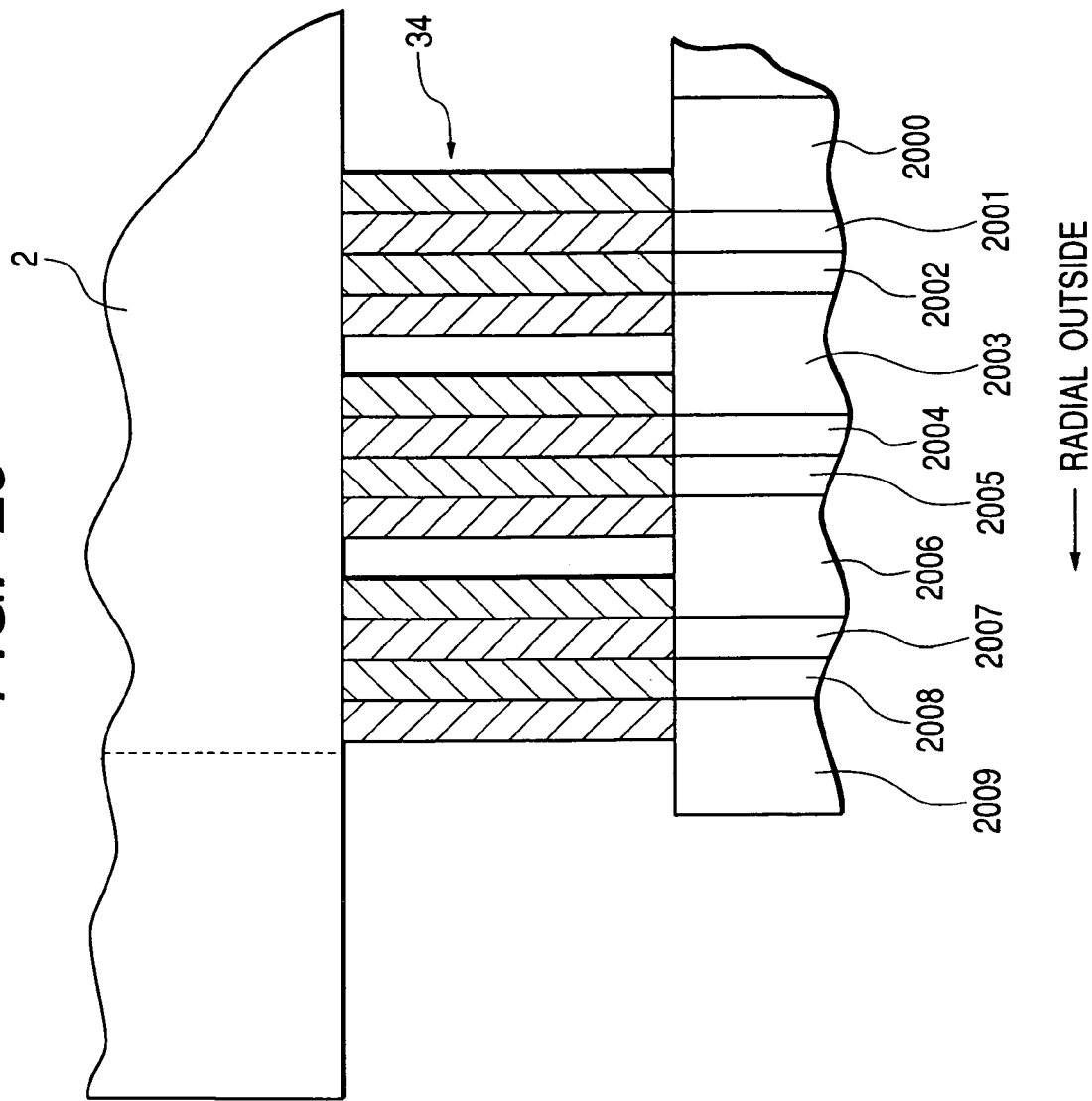
FIG. 29 is a partial view which shows a modification of the segment end-spreading step, as illustrated in FIG. 27.

FIGS. 28 and 29 show modifications of the head and end spreading processes in the third embodiment which are employed to make a one-slot twelve-conductor segment stator coil in which the radially arrayed four-conductor leg coils 401 to 403 are arrayed in the radius direction of the core 2.

In FIG. 28, the rings 1005 and 1007 disposed in the odd positions are turned in a clockwise direction, while the rings 1006 and 1008 in the even positions are turned in the counterclockwise direction. The sum of a rotational angle of the rings 1005 and 1007 and a rotational angle of the rings 1006 and 1008 is one magnetic pole pitch. This decreases the friction between the heads 31 of the conductor segments 30 of the different coils disposed adjacent to each other in the radius direction.

In FIG. 29, the rings 2000, 2002, 2004, 2006, and 2008 disposed in the odd positions are turned in the clockwise direction, while the rings 2001, 2003, 2005, 2007, and 2009 are turned in the counterclockwise direction. The sum of a rotational angle of the rings 2000, 2002, 2004, 2006, and 2008 and a rotational angle of the rings 2001, 2003, 2005, 2007, and 2009 is one magnetic pole pitch. This decreases the friction between the end portions 34 of the conductor segments 30 of the different coils disposed adjacent to each other in the radius direction.

Feature and Effect of the Embodiments

Of the standard U-phase conductor segments 101, 102, 104, and 105 disposed at the first to fourth layer position of the slots 700, as illustrated in FIGS. 3 to 8, the conductor segments 101 and 104 are identical in configuration. Similarly, the conductor segments 102 and 105 are identical in configuration. The conductor segment 101 extends outside the conductor segment 102 in the axial direction of the core 2. The conductor segment 104 extends outside the conductor segment 105 in the axial direction of the core 2. Specifically, the conductor segments 101 and 104 are made of large-sized turn conductor segments 300, as clearly shown in FIG. 1, while the conductor segments 102 and 105 are made of small-sized turn conductor segments 301.

The standard U-phase conductor segments 103 and 106 disposed at the fifth and sixth layer positions of the slots 700, as illustrated in FIGS. 3 to 8, are identical in configuration and do not intersect each other spatially. They are, therefore, made of small-sized conductor segments 302, like the conductor segments 102 and 103.

The above described conductor segment arrangements permit most of the standard U-phase conductor segments forming the U-phase coil to be arrayed double at the segment head-side coil end 9 in the axial direction of the core 2, thus allowing the axial overall length of the rotary electrical machine to be decreased greatly as compared with the convention one equipped with triply arrayed conductor segments. This also permits a clearance between the segment head-side coil end 9 an inner end wall of the housing 5 to be increased, thus facilitating a flow of ventilating air to improve the cooling capability of the rotary electrical machine. Further, the length of the heads of the conductor segments forming the stator head-side coil end is allowed to be decreased as compared with the conventional rotary electrical machine, thus resulting a deceased electrical resistance thereof, leading to decreases in quantity of generated head and electrical losses.

It has been found that use of the U-phase special phase conductor segments having the side conductor portions disposed at an interval away from each other that is different from that of the standard U-phase conductor segments enables the conductor segments of the same phase to be arrayed in adjacent some (three in this embodiment) of the slots, thereby improving a slot space factor, as offered by typical sequentially joined-segment stator coil, and producing beneficial effects as discussed below.

The arrangement of the side conductor portions 33 of the conductor segments 30 of the same phase within adjacent three of the slots 700 through which an electrical current flows in the same direction permits turns of the winding of the stator coil 3 to be increased without increasing magnetic poles thereof, thus enabling the rotary electrical machine to be employed in a high-voltage system, which allows manufacturing costs of an inverter and wire to be decreased and results in a decrease in quantity of generated heat. No need for increasing the magnetic poles of the stator 1 permits the frequency of a stator coil voltage to be decreased at the same speed as that in the conventional rotary electrical machine, thus resulting in decreases in inductance loss of wire and switching loss of the inverter (i.e., a switching transition loss), which leads to improved efficiency of the rotary electrical machine.

As a modification of the structure of this embodiment in which the same phase conductor segments 30 are disposed in adjacent some of the slots 700, a stator coil in which two of more of the side conductor portions 33 of the conductor segments 30 are arrayed adjacent each other within a single slot having a greater width in the circumferential direction of the core 2 may be proposed. This structure, however, requires a margin in the slots in the circumferential direction of the core 2 in order to alleviate a drawback in that the adjacent conductor segments disposed in the slot grind on each other to scrape resinous sheaths away from each other, thus resulting in decreases in slot space factor and number of the slots. This causes mechanical noises and vibrations to be increased. Additionally, the close proximity of the side conductor portions 33 of the conductor segment 30 arrayed within each of the slots in the circumferential direction of the core 2 results in unwanted special interference thereof at the coil ends. In contrast, the structure of this embodiment has, as shown in FIG. 2, the tooth 800 formed between adjacent two of the slots 700 so that the side conductor portions 33 of the conductor segments 30 do not abut on each other in the circumferential direction of the core 2, thus avoiding the spatial interference thereof at the coil ends.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

The U-shaped standard and special U-phase conductor segments are not limited in configuration to the one as described above and may alternatively have a V-shape. The side conductor portions 33 of the conductor segments 30 may alternatively be disposed within adjacent two or more than three of the slots 700. The number of the side conductor portions 33 arrayed within each of the slots 700 in the radius direction of the core 2 may be more than six. The U-, V-, and W-phase coils are, as described above, joined together through the so-called star connection, but may alternatively be joined through the so-called delta connection.

What is claimed is:

1. A rotary electrical machine for a high-voltage vehicle comprising:
   a stator core having opposed ends and slots formed at given intervals in a circumferential direction of said stator core; and
   a three-phase sequentially joined-segment stator coil which includes three phase coils joined together through one of a star connection and a delta connection, each of the phase coils including a plurality of conductor segments each of which includes a head portion, a pair of slot-inserted portions, and a pair of end portions, each of the head portions having one of substantially U- and V-shapes, extending in a circumferential direction of said stator core at one of the ends of the stator core, the slot-inserted conductor portions of each pair continuing from ends of one of the head portions, inserted into two of the slots of the stator core which are spaced at given slot pitches, a given number of the slot-inserted conductor portions being disposed in each of the slots in alignment in a radius direction of said stator core, the end portions projecting from the slot-inserted conductor portions outside the other end of the stator core in the axial direction thereof, and extending substantially in the circumferential direction of the stator core,
   wherein said conductor segments are connected in series through joints each provided between two of tips of the end portions to complete each of said phase coils, and
   wherein each of the phase coils is made up of different types of the conductor segments joined in series, one of the types being different from another of the types in slot pitch between the slots within which the slot-inserted portions of each of the conductor segments are disposed,
   wherein six of the slot-inserted conductor portions are arrayed in each of the slots in line in a radius direction of said stator core, and
   wherein each of the slot-inserted conductor portions of each of the conductor segments forming each of said phase coils is disposed within one of adjacent three of the slots, the adjacent three having disposed therein the slot-inserted conductor portions through which electrical currents flow in the same direction, and wherein each of said phase coils is made up of a first type, a second type, and a third type of the conductor segments, the slot-inserted conductor portions of each of the conductor segments of the first type being spaced from each other at eight slot pitches, the slot-inserted conductor portions of each of the conductor segments of the second type being spaced from each other at nine slot pitches, the slot-inserted conductor portions of each of the conductor segments of the third type being spaced from each other at eleven slot pitches.

* * * * *